US012581395B2

(12) United States Patent　　(10) Patent No.:　US 12,581,395 B2
Kim et al.　　(45) Date of Patent:　Mar. 17, 2026

(54) METHOD FOR TRANSMITTING AND RECEIVING SIGNALS FOR WIRELESS COMMUNICATION, AND APPARATUS THEREFOR

(71) Applicant: LG ELECTRONICS INC., Seoul (KR)

(72) Inventors: Jaehyung Kim, Seoul (KR); Youngdae Lee, Seoul (KR); Joonkui Ahn, Seoul (KR); Hyunsoo Ko, Seoul (KR); Suckchel Yang, Seoul (KR); Seonwook Kim, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 517 days.

(21) Appl. No.: 17/923,889

(22) PCT Filed: May 17, 2021

(86) PCT No.: PCT/KR2021/006130
§ 371 (c)(1),
(2) Date: Nov. 7, 2022

(87) PCT Pub. No.: WO2021/230726
PCT Pub. Date: Nov. 18, 2021

(65) Prior Publication Data
US 2023/0180110 A1　　Jun. 8, 2023

(30) Foreign Application Priority Data

May 15, 2020　(KR) ........................ 10-2020-0058656
May 15, 2020　(KR) ........................ 10-2020-0058684

(51) Int. Cl.
*H04W 48/16*　　(2009.01)
*H04W 8/24*　　(2009.01)
(Continued)

(52) U.S. Cl.
CPC ............. *H04W 48/16* (2013.01); *H04W 8/24* (2013.01); *H04W 48/02* (2013.01); *H04W 48/08* (2013.01)

(58) Field of Classification Search
None
See application file for complete search history.

(56) References Cited

U.S. PATENT DOCUMENTS

| | | | |
|---|---|---|---|
| 2016/0150462 A1* | 5/2016 | Yang ................. | H04W 74/0833 370/254 |
| 2020/0077364 A1* | 3/2020 | Basu Mallick ......... | H04W 4/70 |

(Continued)

FOREIGN PATENT DOCUMENTS

| | | |
|---|---|---|
| KR | 10-2013-0016222 A | 2/2013 |
| KR | 10-2016-0032024 A | 3/2016 |
| KR | 10-2019-0017731 A | 2/2019 |

OTHER PUBLICATIONS

"Ericsson", Enhancements to initial access procedure, Nov. 18-22, 2019, 3GPP TSG-RAN WG1 Meeting #99, R1-1912710, pp. 1-23 (Year: 2019).*

(Continued)

*Primary Examiner* — Steve R Young
(74) *Attorney, Agent, or Firm* — BRYAN CAVE LEIGHTON PAISNER LLP

(57) ABSTRACT

A terminal for performing an initial cell access, according to an embodiment of the present disclosure, receives a PBCH signal of a first cell via a cell search, receives SIB1-scheduling information on a CSS set related to the PBCH signal, and determines whether to perform a remaining access procedure on the first cell, on the basis of the SIB1-scheduling information, wherein the terminal is a second type terminal in which the capability is reduced to support a bandwidth narrower than that of a first type terminal, and the terminal may determine, as the second type (Continued)

terminal, whether an access to the first cell is allowed, on the basis of the state of a bit reserved so as not to be used by the first type terminal within the SIB1-scheduling information.

12 Claims, 10 Drawing Sheets

(51) Int. Cl.
*H04W 48/02* (2009.01)
*H04W 48/08* (2009.01)

(56) References Cited

U.S. PATENT DOCUMENTS

| | | | | |
|---|---|---|---|---|
| 2022/0394601 A1* | 12/2022 | Zhang | .................. | H04L 1/1893 |
| 2023/0189124 A1* | 6/2023 | Kusashima | .......... | H04L 5/0053 |
| | | | | 370/312 |
| 2023/0209542 A1* | 6/2023 | Wang | .................. | H04L 5/0053 |
| | | | | 370/329 |

OTHER PUBLICATIONS

R1-1912710: Ericsson, 3GPP TSG-RAN WG1 Meeting #99, Reno, USA, Nov. 18-22, 2019, "Enhancement to initial access procedure," Nov. 9, 2019 (23 Pages).

* cited by examiner ( a )

METHOD FOR TRANSMITTING AND RECEIVING SIGNALS FOR WIRELESS COMMUNICATION, AND APPARATUS THEREFOR

This application is the National Stage filing under 35 U.S.C. 371 of International Application No. PCT/KR2021/006130, filed on May 17, 2021, which claims the benefit of and priority to Korean Application No. 10-2020-0058656, filed on May 15, 2020 and Korean Application No. 10-2020-0058684, filed on May 15, 2020, the contents of which are all hereby incorporated by reference herein in their entirety.

TECHNICAL FIELD

The present disclosure relates to wireless communication, and more particularly, to a method and apparatus for cell access in a wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

The object of the present disclosure is to provide an efficient cell access method and apparatus therefor The present disclosure is not limited to the above-described object, and other objects that the present disclosure could achieve will be more clearly understood from the following detailed description.

Technical Solution

In an aspect of the present disclosure, there is provided a method of performing initial cell access by a user equipment (UE) in a 3rd generation partnership project (3GPP)-based wireless communication system. The method may include: receiving a physical broadcast channel (PBCH) signal of a first cell through cell search; receiving system information block 1 (SIB1)-scheduling information in a common search space (CSS) set related to the PBCH signal; and determining whether to perform a residual access procedure to the first cell based on the SIB1-scheduling information. The UE may be a second type of UE with reduced capability to support a narrower bandwidth than a first type of UE. In determining whether to perform the residual access procedure to the first cell, the UE may be configured to determine whether the UE is allowed to access the first cell as the second type of UE, based on a reserved bit state in the SIB1-scheduling information, wherein the reserved bit state is not to be used by the first type of UE.

Based on whether the reserved bit state corresponds to a first state, the UE may be configured to perform the residual access procedure to the first cell or search for a second cell without performing the residual access procedure.

Based on that the reserved bit state does not correspond to a first state, the UE may be configured to: determine that as the second type of UE, the UE is allowed to access the first cell; and obtain scheduling information in an SIB1 for the second type of UE from the reserved bit state.

Based on that the reserved bit state does not correspond to a first state, the UE may be configured to determine that the SIB1-scheduling information schedules both a first SIB1 related to the first type of UE and a second SIB1 related only to the second type of UE.

Based on the determination that the UE is allowed to access the first cell as the second type of UE, the UE may be configured to receive a second SIB1 related only to the second type of UE based on the SIB1-scheduling information. The UE may be configured to determine a resource location of the second SIB1 based on a resource location of a first SIB1 related to the first type of UE.

The UE may be configured to obtain an offset between the resource location of the first SIB1 and the resource location of the second SIB1 based on the reserved bit state.

The SIB1-scheduling information may be downlink control information (DCI) received in a physical downlink control channel (PDCCH)-CSS set shared between the first type of UE and the second type of UE.

Based on that scheduling information in an SIB1 for the second type of UE has been obtained from the reserved bit state, the UE may be configured to determine that the first cell allows access of the second type of UE.

In another aspect of the present disclosure, there is provided a processor-readable storage medium configured to store a program for executing the above-described method.

In another aspect of the present disclosure, there is provided a device for 3GPP-based wireless communication. The device may include: a memory configured to store instructions; and a processor configured to execute the instructions to: receive a PBCH signal of a first cell through cell search; receive SIB1-scheduling information in a CSS set related to the PBCH signal; and determine whether to perform a residual access procedure to the first cell based on the SIB1-scheduling information. The device may be a second type of device with reduced capability to support a narrower bandwidth than a first type of device. In determining whether to perform the residual access procedure to the first cell, the processor may be configured to determine whether the device is allowed to access the first cell as the second type of device, based on a reserved bit state in the SIB1-scheduling information, wherein the reserved bit state is not to be used by the first type of UE.

The device may further include a transceiver configured to transmit and receive a radio signal under control of the processor. The device may be a UE for the 3GPP-based wireless communication.

The device may be an application-specific integrated circuit (ASIC) or a digital signal processing device.

In another aspect of the present disclosure, there is provided a method of transmitting a signal by a base station in a 3GPP-based wireless communication system. The method may include: transmitting a PBCH signal through a first cell; and transmitting SIB1-scheduling information in a CSS set related to the PBCH signal. The base station may be configured to allow access of a second type of UE on at least one cell, where the second type of UE has reduced capability to support a narrower bandwidth than a first type of UE. The base station may be configured to indicate whether the first cell allows the access of the second type of UE based on a reserved bit state in the SIB1-scheduling information, wherein the reserved bit state is not to be used by the first type of UE.

In a further aspect of the present disclosure, there is provided a base station for 3GPP-based wireless communication. The base station may include: a memory configured to store instructions; and a processor configured to execute the instructions to: transmit a PBCH signal through a first cell; and transmit SIB1-scheduling information in a CSS set related to the PBCH signal. The processor may be configured to allow access of a second type of UE on at least one cell, wherein the second type of UE has reduced capability to support a narrower bandwidth than a first type of UE. The processor may be configured to indicate whether the first cell allows the access of the second type of UE based on a reserved bit state in the SIB1-scheduling information, wherein the reserved bit state is not to be used by the first type of UE.

Advantageous Effects

According to an embodiment of the present disclosure, a user equipment (UE) with reduced capability for a maximum supportable bandwidth may perform initial cell access efficiently.

The present disclosure is not limited to the above-described effect, and other effects that the present disclosure could achieve will be more clearly understood from the following detailed description.

DETAILED DESCRIPTION

Figure 1:
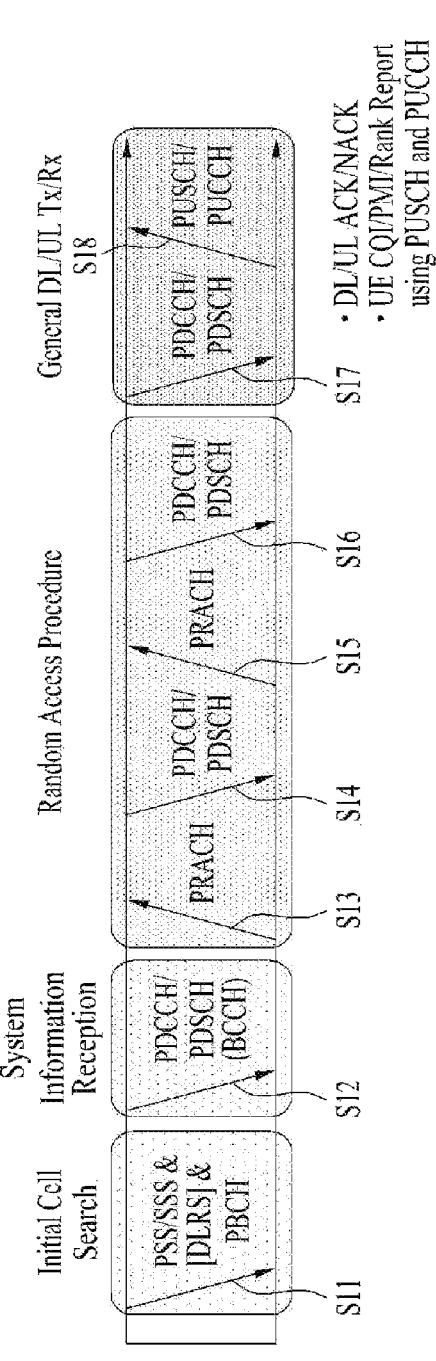
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto. LTE refers to technologies after 3GPP TS 36.xxx Release 8. Specifically, LTE technologies after 3GPP TS 36.xxx Release 10 are referred to as LTE-A, and LTE technologies after 3GPP TS 36.xxx Release 13 are referred to as LTE-A pro. 3GPP NR refers to technologies after TS 38.xxx Release 15. LTE/NR may be referred to as 3GPP systems. In this document, "xxx" represents the detail number of a specification. LTE/NR may be collectively referred to as 3GPP systems.

Details of the background, terminology, abbreviations, etc. used herein may be found in documents published before the present disclosure. For example, the present disclosure may be supported by the following documents:

3GPP NR

3GPP TS 38.211: Physical channels and modulation

3GPP TS 38.212: Multiplexing and channel coding

3GPP TS 38.213: Physical layer procedures for control

3GPP TS 38.214: Physical layer procedures for data

3GPP TS 38.215: Physical layer measurements

3GPP TS 38.300: NR and NG-RAN Overall Description

3GPP TS 38.304: User Equipment (UE) procedures in idle mode and in RRC inactive state 3GPP TS 38.321: Medium Access Control (MAC) protocol 3GPP TS 38.322: Radio Link Control (RLC) protocol 3GPP TS 38.323: Packet Data Convergence Protocol (PDCP)

3GPP TS 38.331: Radio Resource Control (RRC) protocol

5

3GPP TS 37.324: Service Data Adaptation Protocol (SDAP)

3GPP TS 37.340: Multi-connectivity; Overall description

3GPP TS 23.287: Application layer support for V2X services; Functional architecture and information flows 3GPP TS 23.501: System Architecture for the 5G System 3GPP TS 23.502: Procedures for the 5G System 3GPP TS 23.503: Policy and Charging Control Framework for the 5G System; Stage 2

3GPP TS 24.501: Non-Access-Stratum (NAS) protocol for 5G System (5GS); Stage 3

3GPP TS 24.502: Access to the 3GPP 5G Core Network (SGCN) via non-3GPP access networks 3GPP TS 24.526: User Equipment (UE) policies for 5G System (5GS); Stage 3

Technical Terms Used in this Document

FR1: Frequency Range 1 (FR1) refers to a frequency range below 6 GHz (e.g., 450 MHz to 6000 MHz).

FR2: Frequency Range 2 (FR2) refers to a millimeter wave (mmWave) region above 24 GHz (e.g., 24250 MHz to 52600 MHz).

RNTI: Radio Network Temporary Identifier

SIB: System Information Block

SIB1: SIB1 for NR devices=RMSI (Remaining Minimum System Information). SIB1 is used to broadcast information necessary for cell access of NR UEs.

CORESET: A control resource set (CORESET) refers to time/frequency resources on which a NR UE attempts to decode candidate PDCCHs.

CORESET #0: CORESET #0 refers to a CORESET for a Type0-PDCCH CSS set for NR devices (configured by an MIB).

Type0-PDCCH CSS set: The Type0-PDCCH CSS set refers to a search space set in which a NR UE monitors a set of PDCCH candidates for a DCI format with a CRC scrambled by an SI-RNTI.

MO: PDCCH Monitoring Occasion for Type0-PDCCH CSS set

SIB1-R: SIB1-R refers to (additional) SIB1 for reduced capability NR devices. SIB1-R may be generated as a TB different from that of SIB1 and transmitted on a different PDSCH.

CORESET #O-R: CORESET #0 for reduced capability NR devices

Type0-PDCCH-R CSS set: Type0-PDCCH-R CSS set refers to a search space set in which a RedCap UE monitors a set of PDCCH candidates for a DCI format with a CRC scrambled by an SI-RNTI.

MO-R: PDCCH Monitoring Occasion for Type0-PDCCH CSS set

Cell defining SSB: A cell defining SSB (CD-SSB) refers to an SSB including RMSI scheduling information among NR SSBs.

Non-cell defining SSB: A non-cell defining SSB (non-CD-SSB) refers to an SSB that is deployed in a NR synchronization raster but does not include RMSI scheduling information on a cell for measurement. However, the non-CD-SSB may contain information indicating the location of a CD-SSB.

SCS: subcarrier spacing

SI-RNTI: System Information Radio-Network Temporary Identifier

Camp on: "Camp on" is the UE state in which the UE stays on a cell and is ready to initiate a potential dedicated service or to receive an ongoing broadcast service.

TB: Transport Block

RSA (RedCap standalone): RSA means a cell that supports only RedCap devices or services

In the present disclosure, the term "set/setting" may be replaced with "configure/configuration", and both may be used interchangeably. Further, a conditional expression (e.g., "if", "in a case", or "when") may be replaced by "based on that" or "in a state/status". In addition, an operation or software/hardware (SW/HW) configuration of a user equipment (UE)/base station (BS) may be derived/understood based on satisfaction of a corresponding condition. When a process on a receiving (or transmitting) side may be derived/understood from a process on the transmitting (or receiving) side in signal transmission/reception between wireless communication devices (e.g., a BS and a UE), its description may be omitted. Signal determination/generation/encoding/transmission of the transmitting side, for example, may be understood as signal monitoring reception/decoding/determination of the receiving side. Further, when it is said that a UE performs (or does not perform) a specific operation, this may also be interpreted as that a BS expects/assumes (or does not expect/assume) that the UE performs the specific operation. When it is said that a BS performs (or does not perform) a specific operation, this may also be interpreted as that a UE expects/assumes (or does not expect/assume) that the BS performs the specific operation. In the following description, sections, embodiments, examples, options, methods, schemes, proposals and so on are distinguished from each other and indexed, for convenience of description, which does not mean that each of them necessarily constitutes an independent disclosure or that each of them should be implemented only individually. Unless explicitly contradicting each other, it may be derived/understood that at least some of the sections, embodiments, examples, options, methods, schemes, proposals and so on may be implemented in combination or may be omitted.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

The SSB is composed of four consecutive OFDM symbols, each carrying the PSS, the PBCH, the SSS/PBCH, or the PBCH. Each of the PSS and the SSS includes one OFDM symbol by 127 subcarriers, and the PBCH includes three OFDM symbols by 576 subcarriers. The PBCH is encoded/decoded based on Polar codes, and modulation/demodulation is performed thereon according to quadrature phase shift keying (QPSK). The PBCH in the OFDM symbol consists of data resource elements (REs) to which a complex modulation value of the PBCH is mapped, and demodulation reference signal (DMRS) REs to which a DMRS for the PBCH is mapped. Three DMRS REs are configured for each RB in the OFDM symbol, and three data REs configured between DMRS REs.

The PSS may be used in detecting a cell ID within a cell ID group, and the SSS may be used in detecting a cell ID group. The PBCH may be used in detecting an SSB (time) index and a half-frame. There are 336 cell ID groups, and each cell ID group includes three cell IDs. Thus, there are a total of 1008 cell IDs.

SSBs are periodically transmitted with an SSB periodicity. A default SSB periodicity assumed by the UE in initial cell search is defined as 20 ms. After cell access, the SSB periodicity may be set to one of {5 ms, 10 ms, 20 ms, 40 ms, 80 ms, and 160 ms} by the network (e.g., BS). An SSB burst set may be configured at the beginning of the SSB periodicity. The SSB burst set may be set to a time window of 5 ms (i.e., half-frame), and the SSB may be repeatedly transmitted up to L times within the SS burst set. The maximum number of SSB transmissions L may be given depending carrier frequency bands as follows. One slot includes up to two SSBs For frequency range up to 3 GHz, L=4

For frequency range from 3 GHz to 6 GHz, L=

For frequency range from 6 GHz to 52.6 GHz, L=64

The time-domain positions of candidate SSBs in the SS burst set may be defined depending on subcarrier spacings. The time-domain positions of the candidate SSBs are indexed from (SSB indices) 0 to L−1 in temporal order within the SSB burst set (i.e., half-frame).

Multiple SSBs may be transmitted within the frequency span of a carrier. Each SSB may not need to have a unique physical layer cell identifier, but different SSBs may have different physical layer cell identifiers.

The UE may acquire DL synchronization by detecting the SSB. The UE may identify the structure of the SSB burst set based on the detected SSB (time) index, and thus the UE may detect a symbol/slot/half-frame boundary. A frame/half-frame number to which the detected SSB belongs may be identified based on system frame number (SFN) information and half-frame indication information.

Specifically, the UE may obtain a 10-bit SFN for a frame to which a PBCH belongs from the PBCH. Then, the UE may obtain 1-bit half-frame indication information. For example, when the UE detects the PBCH in which the half-frame indication bit is set to 0, the UE may determine that an SSB to which the PBCH belongs is included in the first half-frame of the frame. When the UE detects the PBCH in which the half-frame indication bit is set to 1, the UE may determine that an SSB to which the PBCH belongs is included in the second half-frame of the frame. Finally, the UE may obtain the SSB index of the SSB to which the PBCH belongs based on a DMRS sequence and a PBCH payload carried by the PBCH.

After initial cell search, the UE may acquire more specific system information by receiving a physical downlink control channel (PDCCH) and receiving a physical downlink shared channel (PDSCH) based on information of the PDCCH in step S102.

System information (SI) is divided into a master information block (MIB) and a plurality of system information blocks (SIBs). The SI except for the MIB may be referred to as remaining minimum system information (RMSI). Details thereof will be described in the following.

The MIB includes information/parameters for monitoring a PDCCH scheduling a PDSCH carrying SIB1 (SystemInformationBlock1), and the MIB is transmitted by the BS over the PBCH of an SSB. For example, the UE may check based on the MIB whether there is a CORESET for a Type0-PDCCH common search space. The Type0-PDCCH common search space is a kind of PDCCH search space, which is used to transmit a PDCCH scheduling an SI message. If the Type0-PDCCH common search space exists, the UE may determine (1) a plurality of contiguous RBs and one or more consecutive symbols included in the CORESET and (ii) a PDCCH occasion (e.g., a time-domain location for PDCCH reception, based on information (e.g., pdcch-ConfigSIB1) in the MIB. If the Type0-PDCCH common search space does not exist, pdcch-ConfigSIB1 provides information on a frequency location at which the SSB/SIB1 exists and information on a frequency range where there are no SSB/SIB1.

SIB1 includes information related to availability and scheduling (e.g., transmission periodicity, SI-window size, etc.) of the remaining SIBs (hereinafter referred to as SIBx where x is an integer more than or equal to 2). For example, SIB1 may indicate whether SIBx is periodically broadcast or provided at the request of the UE in an on-demand manner. When SIBx is provided in an on-demand manner, SIB1 may include information necessary for the UE to send an SI request. SIB1 is transmitted over a PDSCH, and a PDCCH scheduling SIB1 is transmitted in the Type0-PDCCH common search space. That is, SIB1 is transmitted over the PDSCH indicated by the PDCCH.

SIBx is included in the SI message and transmitted on the PDSCH. Each SI message is transmitted within a periodically occurring time window (i.e., SI-window).

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
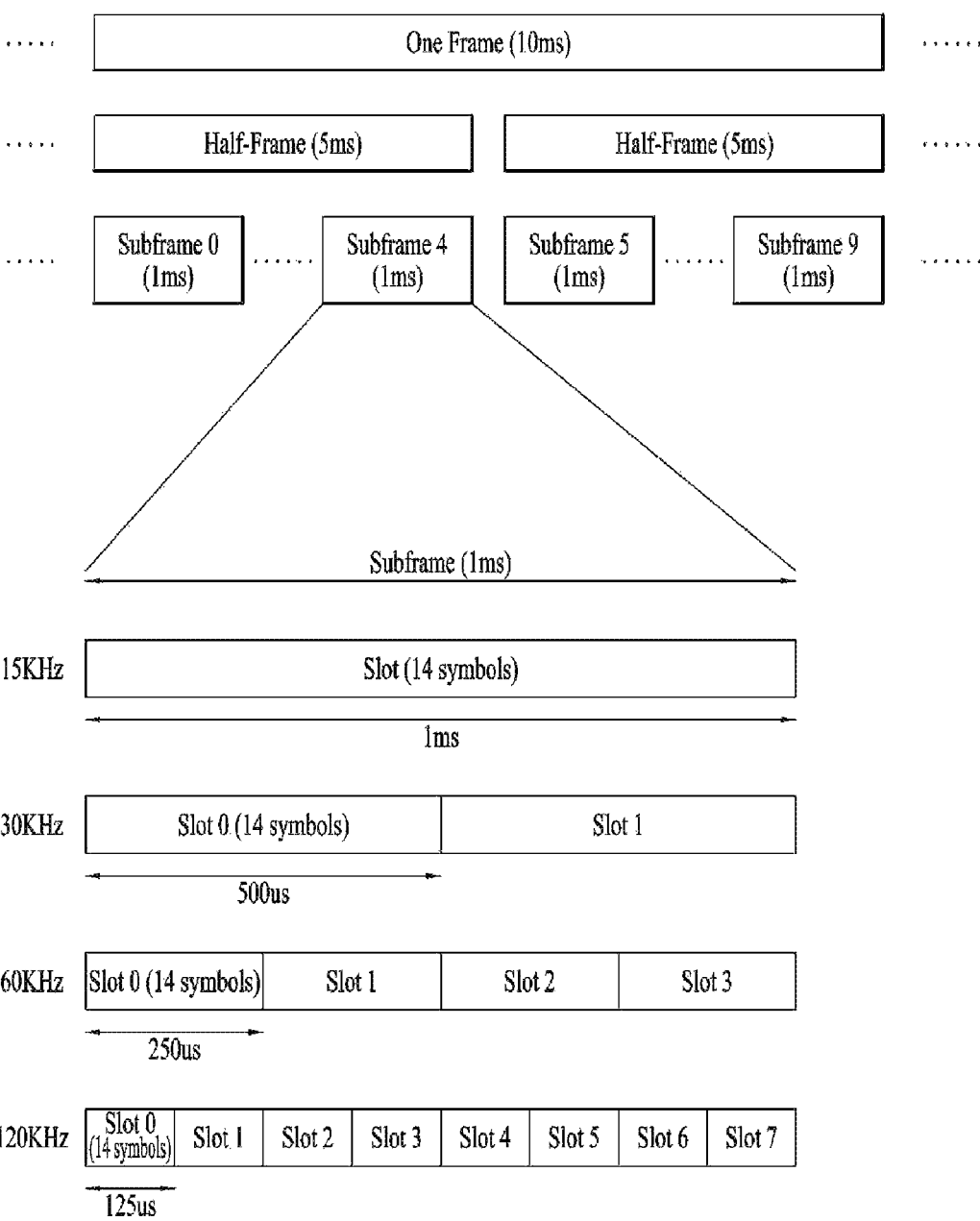
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15 \times 2^u$) | $N^{slot}_{symb}$ | $N^{frame,u}_{slot}$ | $N^{subframe,u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

$N^{slot}_{symb}$: Number of symbols in a slot
$N^{frame,u}_{slot}$: Number of slots in a frame
$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15 \times 2^u$) | $N^{slot}_{symb}$ | $N^{frame,u}_{slot}$ | $N^{subframe,u}_{slot}$ |
|---|---|---|---|
| 60 kHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
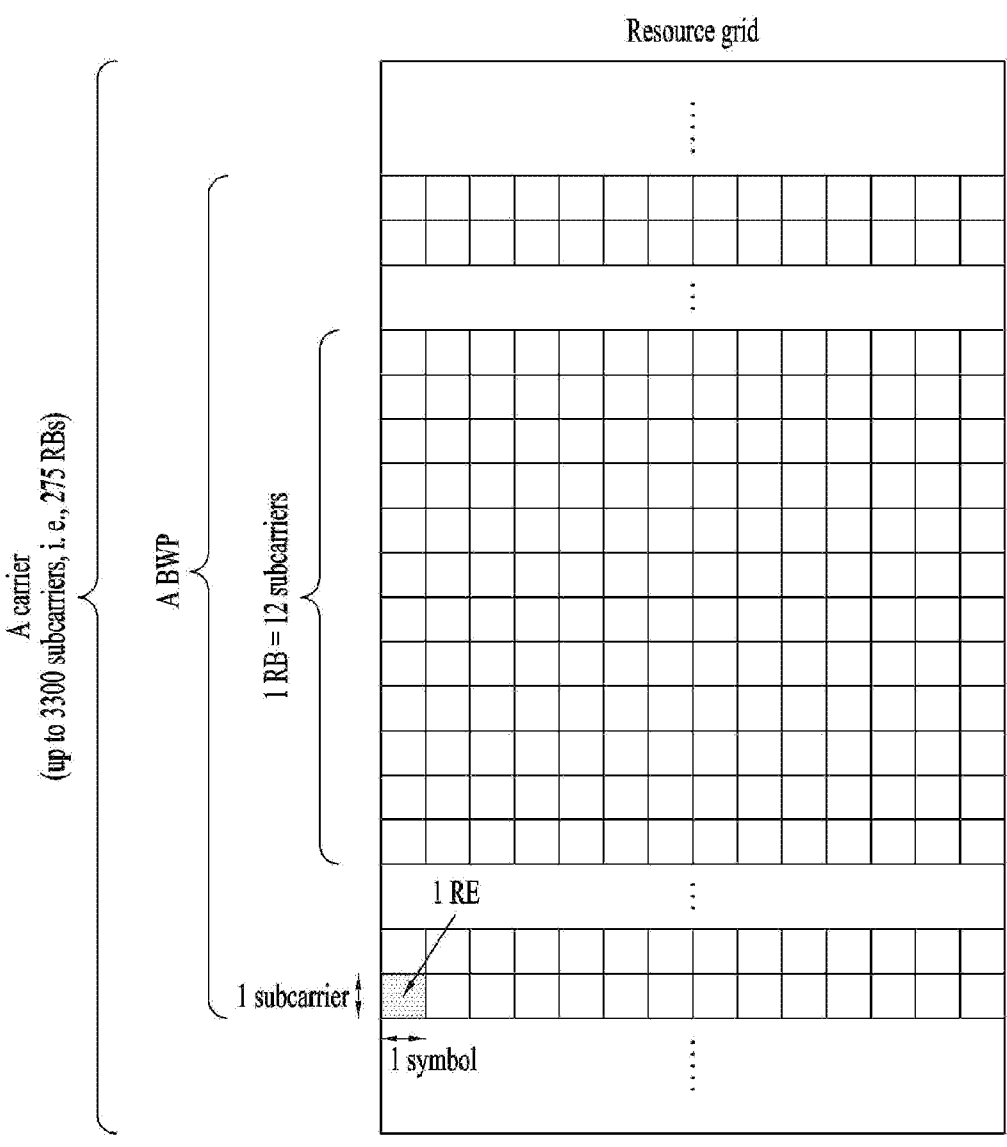
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Bandwidth Part (BWP)

The NR system may support up to 400 MHz for each carrier. The network may instruct the UE to operate only in a partial bandwidth rather than the whole bandwidth of such a wideband carrier. The partial bandwidth is referred to as a BWP. The BWP refers to a subset of contiguous common RBs defined for a numerology in the BWP of a carrier in the frequency domain, and one numerology (e.g., SCS, CP length, slot/mini-slot duration, etc.) may be configured.

Activation/deactivation of a DL/UL BWP or BWP switching may be performed according to network signaling and/or timers (e.g., L1 signaling corresponding to a physical layer control signal, a MAC control element corresponding to a MAC layer control signal, RRC signaling, etc.). While performing initial access or before setting up an RRC connection, the UE may not receive any DL/UL BWP configurations. A DL/UL BWP that the UE assumes in this situation is referred to as an initial active DL/UL BWP.

Figure 4:
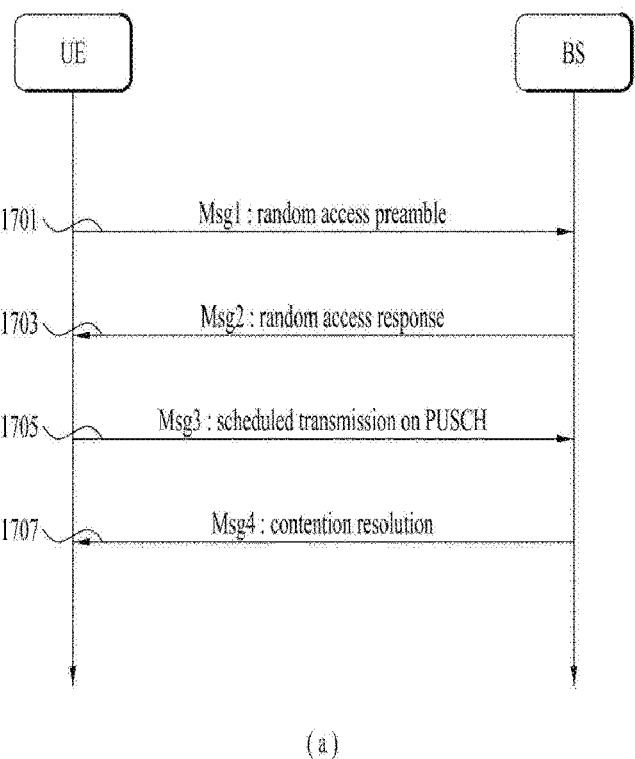
FIG. 4 illustrates a random access procedure.
Figure 4:
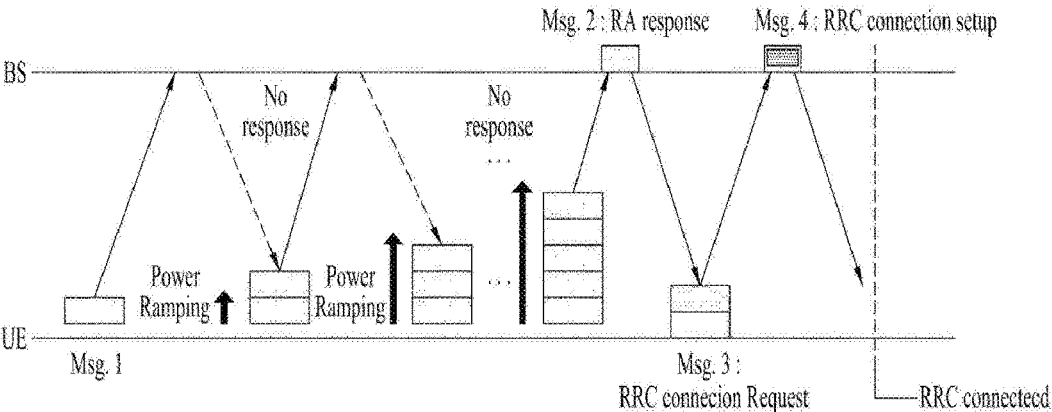

FIG. 4 illustrates an exemplary normal random access procedure. Specifically, FIG. 4 shows a contention-based random access procedure of the UE, which is performed in four steps.

First, the UE may transmit message 1 (Msg1) including a random access preamble on a PRACH (see 1701 of FIG. 4(a)).

Random access preamble sequences with different lengths may be supported. A long sequence length of 839 may be applied to SCSs of 1.25 and 5 kHz, and a short sequence length of 139 may be applied to SCSs of 15, 30, 60, and 120 kHz.

Multiple preamble formats may be defined by one or more RACH OFDM symbols and different CPs (and/or guard times). A RACH configuration for a cell may be included in SI about the cell and provided to the UE. The RACH configuration may include information on the SCS of the PRACH, available preambles, preamble formats, and so on. The RACH configuration may include information about association between SSBs and RACH (time-frequency) resources. The UE transmits a random access preamble on a RACH time-frequency resource associated with a detected or selected SSB.

The threshold of an SSB for RACH resource association may be configured by the network, and a RACH preamble may be transmitted or retransmitted based on an SSB where reference signal received power (RSRP), which is measured based on the SSB, satisfies the threshold. For example, the UE may select one SSB from among SSBs that satisfy the threshold and transmit or retransmit the RACH preamble based on a RACH resource associated with the selected SSB.

Upon receiving the random access preamble from the UE, the BS may transmit message 2 (Msg2) corresponding to a random access response (RAR) message to the UE (see 1703 of FIG. 4(a)). A PDCCH scheduling a PDSCH carrying the RAR may be CRC masked with a random access (RA) radio network temporary identifier (RNTI) (RA-RNTI) and then transmitted. Upon detecting the PDCCH masked by the RA-RNTI, the UE may obtain the RAR from the PDSCH scheduled by DCI carried by the PDCCH. The UE may check whether the RAR includes RAR information in response to the preamble transmitted by the UE, i.e., Msg1. The presence or absence of the RAR information in response to Msg1 transmitted by the UE may be determined based on whether there is a random access preamble ID for the preamble transmitted by the UE. If there is no response to Msg1, the UE may retransmit the RACH preamble within a predetermined number of times while performing power ramping. The UE may calculate PRACH transmit power for retransmitting the preamble based on the most recent path loss and power ramping counter.

The RAR information transmitted on the PDSCH may include timing advance (TA) information for UL synchronization, an initial UL grant, and a temporary cell-RNTI (C-RNTI). The TA information may be used to control a UL signal transmission timing. The UE may transmit a UL signal over a UL shared channel as message 3 (Msg3) of the random access procedure based on the RAR information (see 1705 of FIG. 4(*a*)). Msg3 may include an RRC connection request and a UE identifier. In response to Msg3, the network may transmit message 4 (Msg4), which may be treated as a contention resolution message on DL (see 1707 of FIG. 4(*a*)). Upon receiving Msg4, the UE may enter the RRC_CONNECTED state.

On the other hand, a contention-free random access procedure may be performed when the UE is handed over to another cell or BS or when it is requested by the BS. In the contention-free random access procedure, a preamble to be used by the UE (hereinafter referred to as a dedicated random access preamble) is allocated by the BS. Information on the dedicated random access preamble may be included in an RRC message (e.g., handover command) or provided to the UE through a PDCCH order. When the random access procedure is initiated, the UE may transmit the dedicated random access preamble to the BS. When the UE receives an RAR from the BS, the random access procedure is completed.

As described above, a UL grant in the RAR may schedule PUSCH transmission to the UE. A PUSCH carrying initial UL transmission based on the UL grant in the RAR is referred to as an Msg3 PUSCH. The content of an RAR UL grant may start at the MSB and end at the LSB, and the content may be given as shown in Table 3.

TABLE 3

| RAR UL grant field | Number of bits |
| --- | --- |
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

Figure 5:
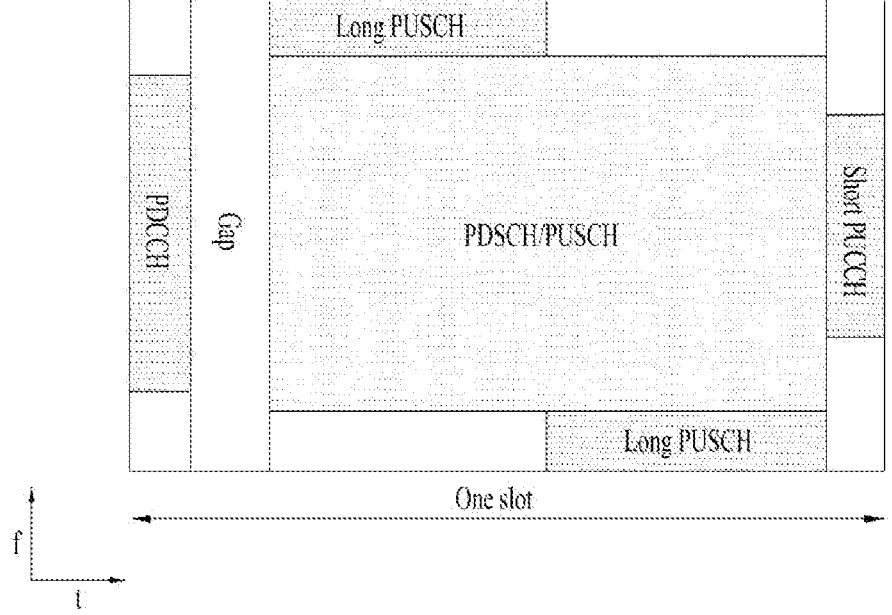
FIG. 5 illustrates an example of physical channel mapping.
Figure 6:
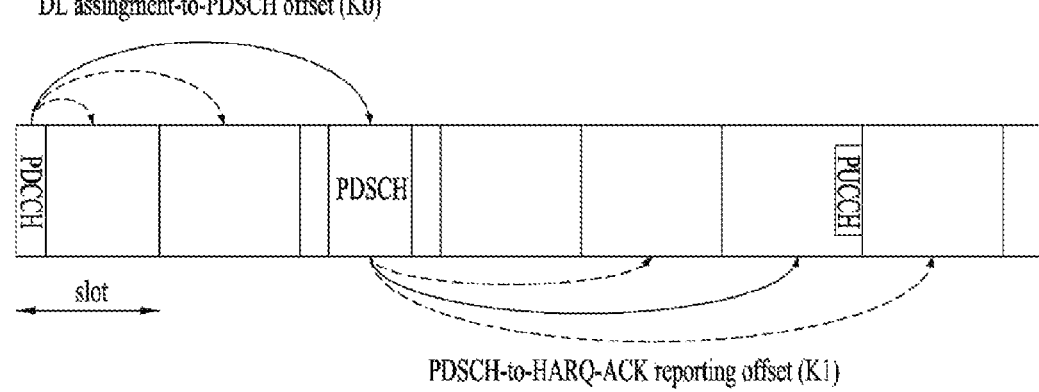
FIG. 6 illustrates an exemplary acknowledgment/negative acknowledgment (ACK/NACK) transmission process.
Figure 7:
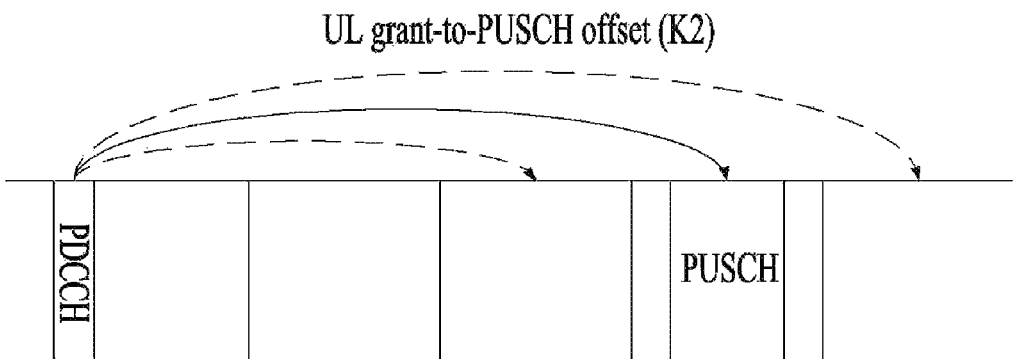
FIG. 7 illustrates an exemplary physical uplink shared channel (PUSCH) transmission process.
Figure 8:
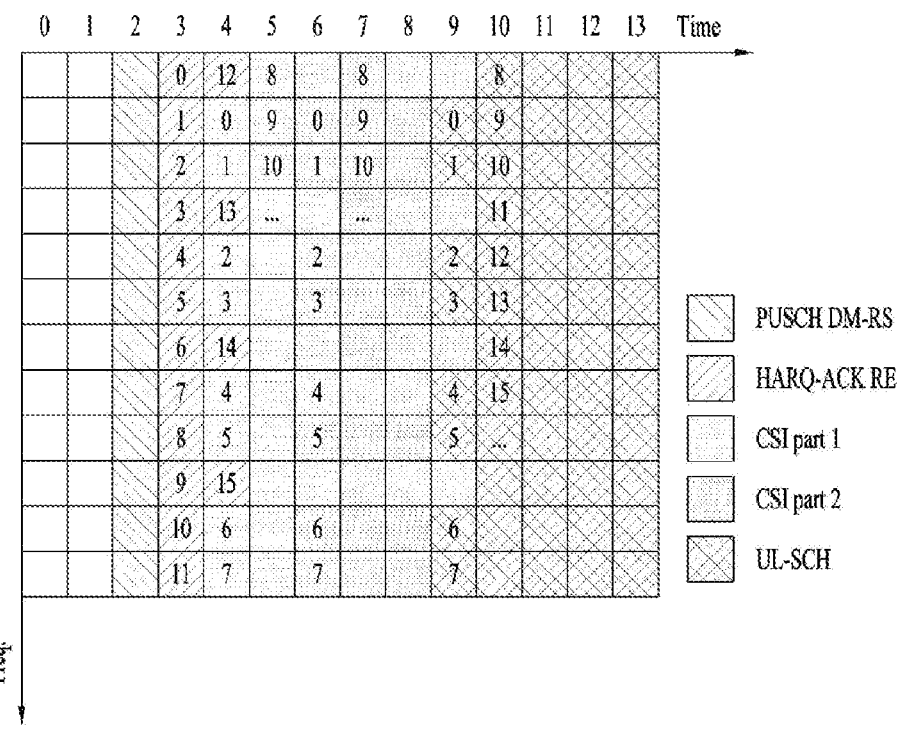
FIG. 8 illustrates an example of multiplexing control information in a PUSCH.

FIG. 5 illustrates exemplary mapping of physical channels in a slot. A PDCCH may be transmitted in a DL control region, and a PDSCH may be transmitted in a DL data region. A PUCCH may be transmitted in a UL control region, and a PUSCH may be transmitted in a UL data region. A guard period (GP) provides a time gap for transmission mode-to-reception mode switching or reception mode-to-transmission mode switching at a BS and a UE. Some symbol at the time of DL-to-UL switching in a subframe may be configured as a GP.

Each physical channel will be described below in greater detail.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH includes 1, 2, 4, 8, or 16 control channel elements (CCEs) according to its aggregation level (AL). A CCE is a logical allocation unit used to provide a PDCCH with a specific code rate according to a radio channel state. A CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, and so on). A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). Specifically, the number of RBs and the number of symbols (3 at maximum) in the CORESET may be configured through higher-layer signaling.

For PDCCH reception/detection, the UE monitors PDCCH candidates. A PDCCH candidate is CCE(s) that the UE should monitor to detect a PDCCH. Each PDCCH candidate is defined as 1, 2, 4, 8, or 16 CCEs according to an AL. The monitoring includes (blind) decoding PDCCH candidates. A set of PDCCH candidates decoded by the UE are defined as a PDCCH search space (SS). An SS may be a common search space (CSS) or a UE-specific search space (USS). The UE may obtain DCI by monitoring PDCCH candidates in one or more SSs configured by an MIB or higher-layer signaling. Each CORESET is associated with one or more SSs, and each SS is associated with one CORESET. An SS may be defined based on the following parameters.

controlResourceSetId: A CORESET related to an SS.

monitoringSlotPeriodicityAndOffset: A PDCCH monitoring periodicity (in slots) and a PDCCH monitoring offset (in slots).

monitoringSymbolsWithinSlot: PDCCH monitoring symbols in a slot (e.g., the first symbol(s) of a CORESET).

nrofCandidates: The number of PDCCH candidates (one of 0, 1, 2, 3, 4, 5, 6, and 8) for each AL=$\{1, 2, 4, 8, 16\}$.

An occasion (e.g., time/frequency resources) in which the UE is to monitor PDCCH candidates is defined as a PDCCH (monitoring) occasion. One or more PDCCH (monitoring) occasions may be configured in a slot.

Table 4 shows the characteristics of each SS.

TABLE 4

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |

TABLE 4-continued

| Type | Search Space | RNTI | Use Case |
|------|--------------|------|----------|
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 5 shows DCI formats transmitted on the PDCCH.

TABLE 5

| DCI format | Usage |
|------------|-------|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping may be performed on a codeword basis, and modulation symbols generated from each codeword may be mapped to one or more layers. Each layer together with a demodulation reference signal (DMRS) is mapped to resources, and an OFDM symbol signal is generated from the mapped layer with the DMRS and transmitted through a corresponding antenna port.

The PUCCH delivers uplink control information (UCI). The UCI includes the following information.

SR (Scheduling Request): Information used to request UL-SCH resources.

HARQ (Hybrid Automatic Repeat reQuest)-ACK (Acknowledgement): A response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI (Channel State Information): Feedback information for a DL channel Multiple input multiple output (MIMO)-related feedback information includes an RI and a PMI.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Reduced Capability (RedCap) Device

Recently, the importance and interest in use case areas over mMTC and eMBB or over mMTC and URLLC are increasing in addition to 5G main use cases (mMTC, eMBB, and URLLC). Accordingly, the need for a UE to efficiently support these use cases in terms of device cost, power consumption, form factor, etc. is also increasing. In the present disclosure, such a UE is called a (NR) reduced capability UE/device or simply, a (NR) RedCap UE/device. In addition, a normal NR UE that supports all or some of the 5G main use cases is referred to as an NR (normal) UE/device to distinguish it from the RedCap device. Specifically, the NR UE may be a UE equipped with all 5G key capabilities (peak data rate, user experienced data rate, latency, mobility, connection density, energy efficiency, spectrum efficiency, area traffic efficiency, etc.) defined by IMT-2020, and the RedCap UE may be a UE of which some capabilities are intentionally reduced to achieve device cost, power consumption, and small form factors.

In this document, 5G use case areas spanning over mMTC and eMBB or over mMTC and URLLC, which are target use cases of the RedCap device, are referred to as RedCap use cases for convenience of description.

The RedCap use cases may not be supported by low power wireless area (LPWA) UEs (e.g., LTE-M, NB-IoT, etc.) in terms of bit rates, latency, etc. However, the RedCap use cases may be functionally supported by NR UEs, but it may be inefficient in terms of UE manufacturing cost, form factors, battery life, and the like. If the above use case area are supported by the RedCap UE having characteristics such as low cost, low power, and small form factors in the 5G network, UE manufacturing and maintenance cost may be reduced The RedCap use cases have significantly diverse requirements in terms of UE complexity, target bit rates, latency, power consumption, etc. In the present disclosure, the requirements that the RedCap UE needs to satisfy are referred to as RedCap requirements. The RedCap requirements may be divided into generic requirements that are commonly applied to all RedCap use cases and use case specific requirements that are applied only to some use case(s). Table 6 illustrates generic and use case specific requirements for three representative RedCap use cases in brief.

TABLE 6

| Use cases | Complex-ity | Form factor | Bit rate (Mbps) | Latency (ms) | Mobility | Battery |
|---|---|---|---|---|---|---|
| Industrial Wireless Sensor | Very low | Very small | A few | Tens of/ A few [1)] | Stationary | Years |
| Video Surveil-lance | Low | Small | A few/ Tens of | Hundreds of | Stationary | |
| Wearables | Low | Small | Tens of | | Mobile | Weeks |

The features supported by the UE/BS to satisfy the RedCap requirements may be roughly divided into; (i) complexity reduction; (ii) power saving; and (iii) coverage recovery/enhancement. (i) Complexity reduction may be related to a reduced number of UE RX/TX antennas, a UE bandwidth (BW) reduction, half-duplex FDD, a relaxed UE processing time, and/or a relaxed UE processing capability. (ii) Power Saving may be related to reduced PDCCH monitoring by a smaller numbers of BDs and CCE limits, extended DRX for RRC inactive and/or idle, and RRM relaxation for stationary devices.

The following two cases are all considered in the present disclosure.

Case A) RedCap use cases are supported by one type of UE (single device type case).

Case B) RedCap use cases are supported by multiple types of UEs (multi-device type case).

For Case A), the RedCap UE may be a UE that satisfies all of the RedCap requirements, that is, all of the generic and use case specific requirements. In addition, the RedCap UE may be a UE supporting all RedCap use cases. In this case, since various requirements need to be satisfied at the same time, there may be a factor of cost increase due to an increase in UE complexity. However, cost reduction may also be expected by mass production according to use case expansion. For Case B), considering diverse requirements of the RedCap use cases, a UE type may be defined and supported for each RedCap use case. In this case, all the generic requirements need to be satisfied in common. Each device type defined for each use case is called a RedCap device type. For Case B), use cases similar in terms of requirements are grouped and supported by one type of UE. Each RedCap device types may support a predefined part of the RedCap UE features or a specific combination thereof. When multiple RedCap device types are defined to support the RedCap use cases, there is an advantage that specific RedCap use case(s) are supported by a RedCap UE optimized in terms of cost, power consumption, etc. For example, the IWS use case may be supported by a very small, inexpensive, and power efficient UE.

In the present disclosure, a reduced capability may include reduced/low complexity/cost, reduced BW, and so on.

RedCap Device Type Classification and Report

The RedCap UE may need to report information on its device type to the BS to support RedCap UE operations different from those of the NR UE.

For example, device types may be classified according to the following criteria.

Classification criterion 1: RedCap device types may be classified based on one of the main requirements. The main requirements that may act as a criterion for classification may include, for example, a supported max data rate (peak bit rate), latency, mobility (stationary/fixed, portable, mobile, etc.), battery lifetime, complexity, coverage, etc. UE feature(s) that need to be supported mandatory or may be selectively supported for each classified RedCap device type (or combinations of the UE features) may be defined in specifications.

Classification criterion 2: Classification may be performed based on UE feature(s) that need to be supported or may be selectively supported (or combinations of the UE features). UE feature(s) (or combinations thereof) predefined in specifications for each RedCap device type may be referred to as a feature set, and a feature set that needs to be supported for each device type may be referred to as a mandatory feature set for the corresponding device type or a mandatory feature set for defining the device type. RedCap use cases may be related to UE types supporting different feature sets.

Classification criterion 3: RedCap device types may be classified based on a combination of capability parameter(s). The capability parameters may be parameters for determining RedCap requirements. For example, capability parameters for determining a RedCap device type may be a BW supported by the UE, a modulation order, the number of MIMO layers, and the like, which are to determine a max data rate requirement supported by the UE. The values of parameters may be a list of actually supportable values or a maximum value among supported values. The combination of capability parameters that determine a RedCap device type may be referred to as a capability parameter set of the corresponding device type. The RedCap device type may be defined, for example, by sorting capability parameter set value(s) in ascending order (or descending order) of supported max data rates. The BW capability of the RedCap UE, that is, the UE maximum BW, may be determined as the minimum BW that satisfies the bit rate required by a target use case.

Classification criterion 4: Considering that the BW capability of the RedCap UE is determined by the required bit rate of each use case, RedCap device types may be classified based on UE BW capabilities. The BW capability for determining the RedCap device type may be, for example, a supported BW (NRB), which is obtained by representing a (max) UE channel BW or (max) UE transmission BW at the RB level. Alternatively, it may be a minimum UE channel BW or a minimum UE transmission BW. Specifically, the following classification may be allowed.

Classification Method 4-1) Classification is performed based on the maximum BW, and an actual BW for data transmission/reception is configured and used (<=maximum BW).

Classification Method 4-2) Classification is performed based on the minimum BW, and an actual BW for data transmission/reception is configured and used (>=minimum BW)

Classification Method 4-3) one or more supportable BWs (set) are defined for each device type, and an actual BW for data transmission/reception is configured and used within the corresponding BWs (set).

For Classification Methods 4-1/4-2/4-3, the maximum BW may be set less than a NR BW (e.g., 20 MHz), and the minimum BW may be set to more than or equal to an SSB BW (e.g., 5 MHz for a 15 kHz SSB).

1. Cell Access of RedCap UE

There are provided methods for a RedCap device to access a NR cell. Specifically, a cell access method based on a NR SSB for efficient coexistence with NR devices in a NR cells will be described.

Figure 9:
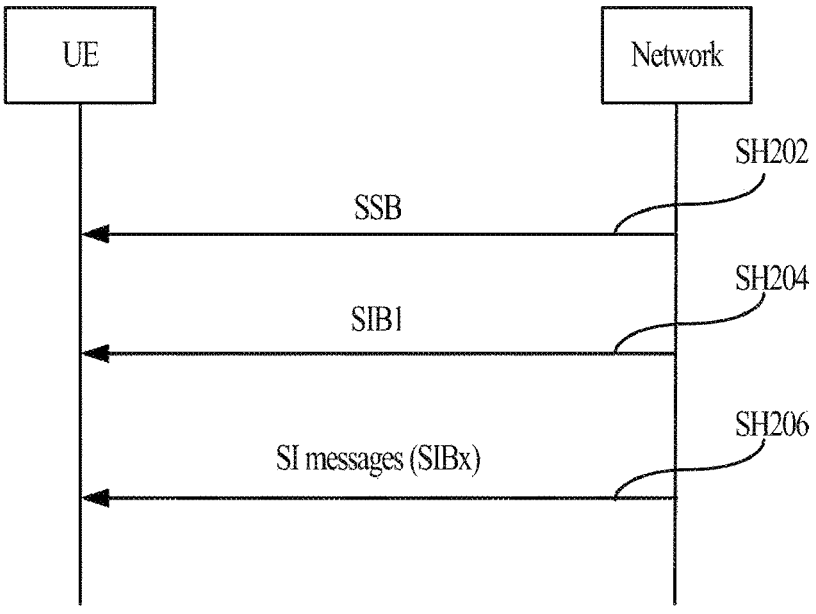
FIG. 9 illustrates exemplary cell access according to an embodiment of the present disclosure.

FIG. 9 illustrates exemplary cell access.

Referring to FIG. 9, the BS may transmit an SSB to the UE, and the UE may receive the SSB from the BS (SH202). The UE may perform cell search, system information acquisition, beam alignment for initial access, and/or DL measurement based on the SSB. The UE may obtain an MIB from the SSB (or a PBCH thereof). As described below, the SSB may be divided into a NR SSB and an SSB-R, and the UE and BS may transmit/receive at least one of the NR SSB and/or SSB-R. In addition, the SSB may be divided into a CD-SSB and a non-CD-SSB, and the UE and BS may transmit/receive at least one of the CD-SSB and/or non-CD-SSB.

The BS may transmit SIB1 to the UE based on the MIB, and the UE may receive SIB1 from the BS based on the MIB (SH204). SIB1 may be transmitted/received based on SIB1-scheduling related information (e.g., CORESET0/CSS configuration for a PDCCH scheduling SIB1) included in the MIB. SIB1 may include information related to availability and scheduling of other SI messages (SIBx, where x>1). As described below, SIB1 may include NR SIB1 or SIB1-R.

The BS may transmit at least one SI message (SIBx, where x>1) to the UE based on SIB1, and the UE may receive the at least one SI message (SIBx, where x>1) from the BS based on SIB1 (SH206).

The cell access proposed below may be applied to the SSB transmission/reception process (SH202) and/or the SIB1 transmission/reception process (SH204), but the present disclosure is not limited thereto.

[Cell Access Related Proposal #1] Access Based on NR CD-SSB

According to "Cell Access Related Proposal #1", when the NR UE and the RedCap UE coexist in the NR network, the RedCap UE may reuse a NR SSB without allocation of separate/dedicated resources for access of the RedCap UE. The reuse of the NR SSB by the RedCap UE may be advantageous in terms of resource efficiency.

It may be advantageous that the RedCap UE determines whether a corresponding cell supports RedCap as early as possible in the cell search process in terms of power saving and cell search time. To this end, the BS may indicate whether the corresponding cell supports RedCap as follows.

[Indication of Whether RedCap UE is Supported]

Example 1-1: Indication of Whether RedCap UE is Supported

The BS may use at least part (e.g., reserved or spare bit(s)) of a PBCH payload (e.g., MIB) generated at the higher layer or some bit(s) of a PBCH payload generated (additionally) at the physical layer (L1) in order to indicate whether a corresponding cell supports the RedCap UE (e.g., indication based on SH202 of FIG. 9).

Example 1-2: Indication of Whether RedCap UE is Supported

The BS may indicate whether a corresponding cell supports RedCap in system information (e.g., at least one of SIB1(–R) and/or SIBX(–R) (where X>1)) (e.g., indication based on SH204 and/or SH206 of FIG. 9). SIBs indicating whether RedCap is supported may be common with the NR UE, or the SIBs may be SIBs (e.g., SIB1-R/SIBx-R) only for the RedCap UE (additionally/separately provided/configured/signaled).

Example 1-3: Indication of Whether RedCap UE is Supported

Figure 10:
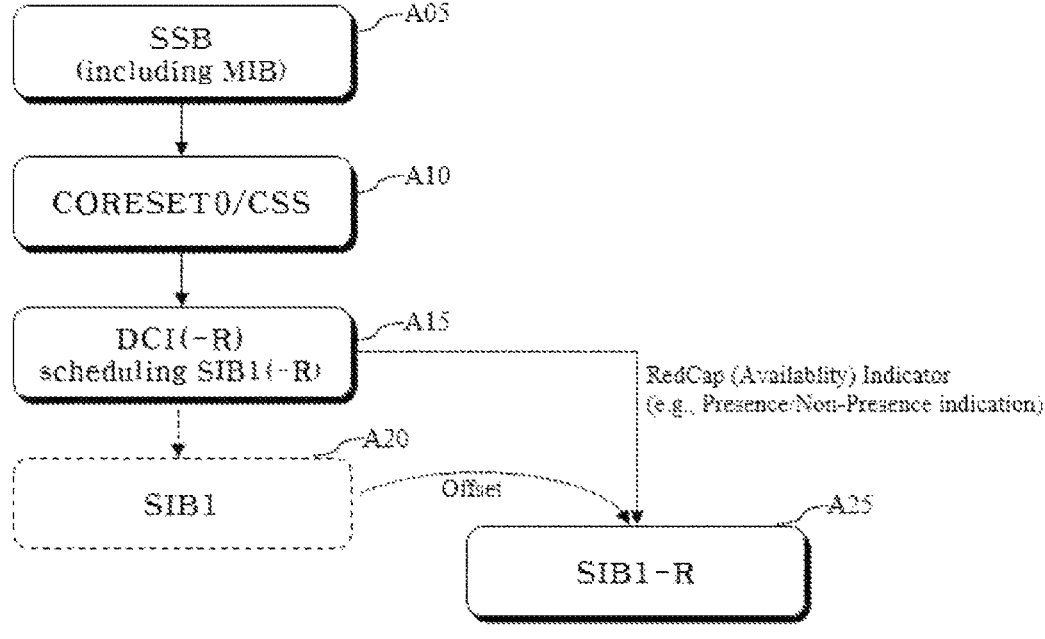
FIG. 10 is a diagram for explaining system information reception during initial cell access according to an embodiment of the present disclosure.

The BS may indicate whether a corresponding cell supports RedCap in DCI (e.g., DCI scheduling SIB1(–R)) (see FIG. 10). For example, the BS may indicate whether the cell supports RedCap by setting at least part (e.g., reserved states/bits) of DCI format 1_0 with a CRC scrambled by an SI-RNTI, which is received in a Type0-PDCCH CSS set, to a specific value. If RedCap is supported, additional information for the RedCap UE may be included in the DCI. For example, if the additional information for the RedCap UE is included, it may be interpreted/understood that the RedCap UE is supported.

For example, to indicate whether the RedCap UE is supported, the corresponding DCI (e.g., DCI format 1_0 with a CRC scrambled by an SI-RNTI for scheduling SIB1(–R)) may include at least one of the following information:

Frequency domain resource assignment—Ceiling [$\log_2$ ($N_{RB}^{DL,BWP}(N_{RB}^{DL,BWP}+1)/2$)] bits, where, $N_{RB}^{DL,BWP}$ is the size of CORESET 0

Time domain resource assignment—4 bits (e.g., as defined in Clause 5.1.2.1 of TS38.214)

VRB-to-PRB mapping—1 bit (e.g., according to Table 7.3.1.2.2-5 of TS38.212)

Modulation and coding scheme—5 bits (e.g., as defined in Clause 5.1.3 of TS38.214, using Table 5.1.3.1-1 of TS38.212)

Redundancy version—2 bits (e.g., as defined in Table 7.3.1.1.1-2 of TS38.212)

System information indicator—1 bit (e.g., as defined in Table 7.3.1.2.1-2 of TS38.212)

Reserved bits—17 bits for operation in a cell with shared spectrum channel access; otherwise 15 bits In the above example, it is assumed that reserved bits are 15 or 17 bits for convenience. The use of the reserved bits may mean that some or all of these bits are used. In addition, the use of reserved states may mean that states are defined by some or all of the reserved bits, and the UE/BS transmits corresponding information based on the defined states.

Specifically, among the reserved states (using all or part of reserved bits), (i) a first state (e.g., all zero) may indicate that RedCap is not supported, and (ii) a second state(s) (e.g., if not all zero) may indicate that RedCap is supported. In addition, (ii) SIB-R (e.g., SIB1-R/SIBx-R) scheduling information for RedCap may be indicated based on (some of) all non-zero states. For example, all or some of the reserved bits may be used for transmission of RedCap SIB-R scheduling information. Fields for the RedCap SIB-R scheduling information (e.g., fields newly defined on the reserved bits) may be set to be the same as or similar to all or some of fields for SIB1 scheduling information transmission in the above DCI example. For example, the field for RedCap SIB-R scheduling information may be set to be the same as or similar to at least part of an FDRA field (e.g., 11 bits when $N_{RB}$=48) and/or at least part of a TDRA field (e.g., 4 bits).

As in the example below, (in Rel-17 and later) the RedCap UE may assume that 15 bits of DCI, which are previously used as reserved bits (on a shared spectrum e.g., when not in unlicensed bands), are configured with SIB-R FDRA (e.g., corresponding to X bits of the FDRA field), SIB-R TDRA (e.g., corresponding to Y bits of the TDRA field), and/or reserved bits (15-X-Y bits) in order to interpret/process/decode DCI.

For example, the normal (e.g., NR) UE other than the RedCap UE may assume/interpret/decode a total of M bits of DCI as reserved bits, whereas the RedCap UE may assume/interpret/decode a total of 'M-X-Y' bits of DCI as Reserved bits in the same DCI.

Considering that the RedCap UE has a small UE BW and limited flexibility compared to the normal UE, SIB-R scheduling information for the RedCap UE may be configured with fewer bits than SIB1 scheduling information for the normal UE. For example, if RedCap supports up to $N_{RB}$=24, the size of SIB-R FDRA may be set to X=9 bits. For example, DCI (e.g., DCI format 1_0 with a CRC scrambled by an SI-RNTI) may include at least some of the following information:

Frequency domain resource assignment—Ceiling [log$_2$ ($N_{RB}^{DL,BWP}$($N_{RB}^{DL,BWP}$+1)/2)] bits, where, $N_{RB}^{DL,BWP}$ is the size of CORESET 0

Time domain resource assignment—4 bits (e.g., as defined in Clause 5.1.2.1 of TS38.214)

VRB-to-PRB mapping—1 bit (e.g., according to Table 7.3.1.2.2-5 of TS38.212)

Modulation and coding scheme—5 bits (e.g., as defined in Clause 5.1.3 of TS38.214, using Table 5.1.3.1-1 of TS38.212)

Redundancy version—2 bits (e.g., as defined in Table 7.3.1.1.1-2 of TS38.212)

System information indicator—1 bit (e.g., as defined in Table 7.3.1.2.1-2 of TS38.212)

Frequency domain resource assignment for SIB(1)-R—X bits

Time domain resource assignment for SIB(1)-R—Y bits

Reserved bits—17-(X+Y) bits for operation in a cell with shared spectrum channel access; otherwise 15-(X+Y) bits For example, the Type0-PDCCH CSS set may be shared between the NR UE and the RedCap UE (e.g., CSS set configuration may be the same or at least partially overlap). As an example, when the Type0-PDCCH CSS set is shared, even DCI may be shared between the NR UE and the RedCap UE. SIB1 scheduling information and SIB1-R scheduling information may be simultaneously transmitted in the same DCI (e.g., single DCI transmission) (e.g., DCI (A15) in FIG. 10 schedules both SIB (A20) and SIB1-R (A25)). As another example, the CSS set may be shared between the NR UE and the RedCap UE, but the DCI may not be shared between the NR UE and the RedCap UE (e.g., DCI (A15) of FIG. 10 schedules only one of SIB1 (A20) or SIB1-R (A25)).

The SIB1-R scheduling information transmitted simultaneously with the SIB1 scheduling information may schedule SIB1-R transmitted additionally/in association with/dependently on SIB1 transmission. For example, in FIG. 10, at least part of SIB1 (A20) as well as SIB1-R (A25) may be used for the RedCap UE. The RedCap UE may need to receive SIB1 (A20) as well as SIB1-R (A25). Alternatively, when receiving SIB1-R (A25), the RedCap UE may use the scheduling information in SIB1 (A20) but may not actually receive SIB1 (A20) (e.g., the RedCap UE may receive SIB1-R(A25) by applying an offset to the position of SIB1(A20)).

Alternatively, as described above, the SIB1-R scheduling information transmitted simultaneously with the SIB1 scheduling information may schedule independent SIB1-R that allows the RedCap UE to access the cell only by receiving SIB1-R without receiving SIB1.

The SIB-R scheduling information may be full resource allocation information, similarly to the FDRA field/TDRA field of DCI format 1_0 with a CRC scrambled by an SI-RNTI. Alternatively, the SIB-R scheduling information may be partial or abbreviated information of the FDRA field/TDRA field of DCI format 1_0 with the CRC scrambled by the SI-RNTI (not to exceed or occupy excessively DCI reserved bits or to reduce DCI overhead). For example, the partial or abbreviated information may be offset information based on the SIB1 scheduling information. For example, the location of a time/frequency resource (e.g., start and/or end) of a PDSCH carrying SIB1-R may be specified by a specific offset (e.g., slot, symbol, RB(s), etc.) that is added/shifted from the start or end of a time/frequency resource of a PDSCH carrying SIB1M the time and/or frequency domain. For example, in this case, the RedCap UE may obtain/determine (additional) SIB1-R scheduling information by referring to time and/or frequency offsets, which are transmitted in the SIB1 scheduling information and reserved bits (some thereof) of DCI.

As in the example below, (in Rel-17 and later) the RedCap UE may assume/interpret/decode that 15 bits of DCI, which are previously used as reserved bits, are configured with a frequency domain offset (e.g., X1 bits), a time domain offset (e.g., Y1 bits), and/or reserved bits (15-X1-Y1 bits) (if not a shared spectrum). Here, since X1 and Y1 are offset values other than full resource allocation, X1 and Y1 may be smaller than X and Y, respectively.

For example, DCI (e.g., DCI format 1_0 with a CRC scrambled by an SI-RNTI) may include at least some of the following information:

Frequency domain resource assignment—Ceiling [log$_2$ ($N_{RB}^{DL,BWP}$($N_{RB}^{DL,BWP}$+1)/2)] bits, where, $N_{RB}^{DL,BWP}$ is the size of CORESET 0

Time domain resource assignment—4 bits (e.g., as defined in Clause 5.1.2.1 of TS38.214)

VRB-to-PRB mapping—1 bit (e.g., according to Table 7.3.1.2.2-5 of TS38.212)

Modulation and coding scheme—5 bits (e.g., as defined in Clause 5.1.3 of TS38.214, using Table 5.1.3.1-1 of TS38.212)

Redundancy version—2 bits (e.g., as defined in Table 7.3.1.1.1-2 of TS38.212)

System information indicator—1 bit (e.g., as defined in Table 7.3.1.2.1-2 of TS38.212)

Frequency domain offset for SIB(1)-R—X1 bits

Time domain offset for SIB(1)-R—Y1 bits

Reserved bits—17-(X1+Y1) bits for operation in a cell with shared spectrum channel access; otherwise 15-(X1+Y1) bits The above method may be interpreted to mean that the RedCap UE is allowed to access a cell only when reserved states/bits of DCI format 1_0 with a CRC scrambled by an SI-RNTI received in a Type0-PDCCH CSS set include SIB1-R scheduling information for the RedCap UE.

In the above-described proposal, SIB1 or SIB1-R may be replaced with an SIB or an SIB-R for RedCap. The SIB may mean an SI message other than SIB1. In the above DCI example, the BS may indicate either SIB1 or the SIB through a system information indicator. Similarly, the BS may indicate either SIB1 scheduling information or SIB scheduling information for RedCap by adding one bit (e.g., RedCap indicator) to the DCI field. In this case, the RedCap UE may use/combine the conventional system information indicator and the one bit (e.g., RedCap indicator) added (to the reserved field) to identify/recognize which one of SIB1, an SIB, SIB1-R, and an SIB-R is scheduled by corresponding DCI. The RedCap indicator may be added to the reserved field as follows.

The following information is transmitted by means of the DCI format 1_0 with a CRC scrambled by SI-RNTI:

Frequency domain resource assignment—Ceiling [$\log_2$ $(N_{RB}^{DL,BWP}(N_{RB}^{DL,BWP}+1)/2)$] bits, where, $N_{RB}^{DL,BWP}$ is the size of CORESET 0

Time domain resource assignment—4 bits (e.g., as defined in Clause 5.1.2.1 of TS38.214)

VRB-to-PRB mapping—1 bit (e.g., according to Table 7.3.1.2.2-5 of TS38.212)

Modulation and coding scheme—5 bits (e.g., as defined in Clause 5.1.3 of TS38.214, using Table 5.1.3.1-1 of TS38.212)

Redundancy version—2 bits (e.g., as defined in Table 7.3.1.1.1-2 of TS38.212)

System information indicator

System information for RedCap indicator or simply Red-Cap indicator—1 bit

Frequency domain offset for SIB(1)-R—X1 bits

Time domain offset for SIB(1)-R—Y1 bits

Reserved bits—17-(1+X1+Y1) bits for operation in a cell with shared spectrum channel access; otherwise 15-(1+X1+Y1) bits

Example 1-4: Indication of Whether RedCap UE is Supported

The BS may indicate whether a corresponding cell supports RedCap in a CORESET #0 BW (configuration) indicated by a PBCH. The CORESET #0 BW may be configured by a pdcch-ConfigSIB1 field of an MIB. For example, the BS may set the CORESET #0 BW to a value exceeding the maximum BW supported by the RedCap UE or set the CORESET #0 BW to a value smaller than the minimum BW supported by the RedCap UE in order to implicitly indicate that the cell does not support RedCap.

In the present disclosure, whether RedCap is supported may be indicated for each cell as described above or may be indicated for each BS/network. As described above in Case B), when RedCap services are supported by multiple device types, whether RedCap is supported may be provided by indicating whether the RedCap services are supported or not (e.g., indicating whether all device types or use cases are supported). Alternatively, whether RedCap is supported may be provided for each device type or for each use case. When the RedCap support is indicated for each device type or use case, it is necessary to provide as many states as the number of device types or use cases. Thus, whether RedCap is supported for each device type or use case may need to be indicated by SIB1(-R), which has a larger signaling capacity than a PBCH, or scheduling DCI (reserved states) in SIB1 (-R).

As one method related to the above proposals, when the BS indicates that a corresponding cell does not support RedCap, the RedCap UE may stop receiving an SSB in a synchronization raster of the corresponding cell. The Red-Cap UE may access a cell supporting RedCap by continuing the cell search operation (e.g., attempting to receive an SSB by changing the synchronization raster).

[Cell Access Related Proposal #2] Access Based on SSB with Frequency (and/or Time) Offset from NR Synchronization Raster The BS may support access of the RedCap UE by disposing a separate SSB at a time and/or frequency location different from that of a CD-SSB for the legacy NR UE. The separate SSB for the access of the RedCap UE, which is different from the CD-SSB, will be referred to as an SSB-R for convenience. The SSB-R may have the same structure (PSS/SSS/PBCH) as the CD-SSB for conventional NR UE access. The relative position from the CD-SSB may be predefined in the form of a time and/or frequency offset. The SSB-R may be used only for the RedCap UE access or may be used together with the CD-SSB to transmit additional information (e.g., RedCap barring information, SIB1-R scheduling information, etc.) for the RedCap UE access.

[Cell Access Related Proposal #2-1] Support of Cell Access Based on SSB-R

The BS may transmit RedCap cell access information over a PBCH included in an SSB-R so that the RedCap UE may perform cell access based on the SSB-R. The PBCH included in the SSB-R is referred to as a PBCH-R for convenience. The PBCH-R may include the following information: timing information (e.g., SFN, half frame indication, SSB index, etc.), PRB grid information (e.g., subcarrier spacing, information on an SSB RE offset compared to a CRB grid, etc.), CORESET #0/Type0-PDCCH CSS set/ initial active DL BWP information, and/or barring information. The barring information indicated by the PBCH-R may indicate whether a corresponding cell supports RedCap. For example, a separate synchronization raster different from that of the NR UE may be defined for the RedCap UE. The separate synchronization raster for the RedCap UE is called a RedCap synchronization raster. The reason for defining the RedCap synchronization raster is to enable the RedCap UE to perform cell access by detecting the SSB-R based on synchronization raster scanning. The RedCap synchronization raster may be defined in the form of NR synchronization raster+frequency offset. The frequency offset may be determined from among values that satisfy the following condition: a probability that the NR UE erroneously detects the SSB-R or the RedCap UE erroneously detects the CD-SSB becomes less than or equal to a specific value.

The method of additionally configuring the SSB-R may be limitedly applied to an NR cell having sufficient DL frequency resources. When the method is not limitedly applied, the probability that the NR UE erroneously detects the SSB-R or the RedCap UE erroneously detects the CD-SSB becomes more than the specific value. Thus, there may be problems that negatively affect the power saving, initial access time, and the like of the RedCap UE or NR UE. In order to solve these problems, it may be considered to use sequence(s) constituting the SSB-R for RedCap UE access different from those of the CD-SSB. The different sequence may be an orthogonal sequence or a time reversal or frequency reversal type of sequence. For the PBCH, the probability of misdetection may be reduced by a DMRS sequence and/or a PBCH scrambling sequence.

When the SSB-R is transmitted in the separate synchronization raster, separate CORESET #0 for the RedCap UE, that is, CORESET #0-R may be transmitted. In this case, the location of CORESET #0-R may be indicated by the PBCH-R with a time and/or frequency offset from the SSB-R. The time offset may be indicated at the level of symbol(s) or slot(s). The frequency offset may be indicated at the level of RE(s), RB(s), a specific subcarrier spacing (SCS) (e.g., minimum SSB subcarrier spacing, 15 kHz for FR1, and 60 kHz for FR2).

[Cell Access Related Proposal #2-2] Support of Cell Access Based on Both CD-SSB and SSB-R The BS may extend the signaling capacity of a PBCH for cell access of the RedCap UE by additionally transmitting an SSB-R for the RedCap UE in addition to a CD-SSB. The BS may additionally transmit cell access information for the RedCap UE such as CORESET #0-R scheduling information by transmitting additional information for access of the RedCap UE in the SSB-R (over a PBCH-R included therein). When the SSB-R is transmitted in addition to the CD-SSB, the UE may need to acquire the cell access information based on information in both of the CD-SSB and the SSB-R. The RedCap UE may acquire common cell access information with the NR UE from the CD-SSB, and the RedCap UE may acquire the information for the RedCap UE cell access from the SSB-R. The RedCap UE may attempt to receive the CD-SSB in a NR synchronization raster. If the RedCap UE succeeds in the reception, the RedCap UE may attempt to receive the SSB-R at a location separated by a predefined time and/or frequency offset from the location of the received CD-SSB. The payload of the PBCH-R transmitted in the SSB-R may be newly defined or reinterpreted for SIB1-R scheduling to support efficient cell access of the RedCap UE.

[Cell Access Related Proposal #2-3] Support of Cell Access Based on CD-SSB and PBCH-R For the RedCap UE, the BS may additionally transmit a PBCH-R together with a CD-SSB. Cell access information (or part thereof) for the NR UE transmitted over a PBCH included in the CD-SSB may commonly applied to the RedCap UE, and cell access information transmitted over the additionally transmitted PBCH-R may be additional cell access information dedicated to the RedCap UE. For example, the common information may be timing information (e.g., SFN, half frame indication, SSB index, etc.), PRB grid information (e.g., SCS, information on an SSB RE offset compared to a CRB grid, etc.), and/or barring information. The additional information may be, for example, information on CORESET #0/Type0-PDCCH CSS set for the RedCap UE, barring information for each device type, and the like.

[Cell Access Related Proposal #3] Access Based on Non-CD-SSB

To offload (additional) loads due to access of the RedCap UE to a specific frequency region, the BS may configure a non-CD-SSB for measurement for the NR UE in one NR synchronization raster and allow the access of the RedCap UE. In this case, the BS may transmit information necessary for the RedCap UE access through part of a PBCH payload transmitted in the non-CD-SSB.

Example 1

The presence of SIB1-R scheduling information for the RedCap UE may be indicated by an unused state (e.g., $k_{SSB}$=30 for FR1 and $k_{SSB}$=14 for FR2) of an SSB-Subcarrier Offset $k_{SSB}$ field transmitted over the PBCH of the non-CD-SSB. The SIB1-R scheduling information for the RedCap UE may be transmitted by a field (RMSI-PDCCH-Config) for transmitting SIB1 scheduling information for the legacy NR UE. In this case, the NR UE may determine that the corresponding SSB include no SIB1 scheduling information and no information on a CD-SSB including SIB1 scheduling information for the NR UE. That is, the operation of the NR UE may be defined as follows. "If a UE detects a SS/PBCH block and determines that a CORESET for Type0-PDCCH CSS set is not present, and for $k_{SSB}$=30 for FR1 or for $k_{SSB}$=14 for FR2, the UE determines that there is no information for a second SS/PBCH block with a CORESET for an associated Type0-PDCCH CSS set on the detected SS/PBCH block." In this case, the NR UE may continue to perform cell search while changing a synchronization raster without information about the CD-SSB including the SIB1 scheduling information.

In Example 1), information on the CD-SSB is not provided to the NR UE attempting to access with the non-CD-SSB, and thus it may cause a delay in the cell search time to the legacy NR UE. To overcome this issue, among PBCH payload bit(s) (additionally) generated at the higher layer and/or physical layer (L1), bit(s)/field(s) not used by the NR UE in the case of the non-CD-SSB (or a combination thereof) may be used to transmit cell access information for the RedCap UE.

A Non-CD-SSB for NR cell access of the RedCap UE may serve as a non-CD-SSB that does not have SIB1 scheduling information and is used for measurement to the legacy NR UE, but the non-CD-SSB for the NR cell access of the RedCap UE may serve as a CD-SSB, that is, an SSB including SIB1-R scheduling information to the RedCap UE. In addition, the RedCap UE may be configured to use the corresponding SSB for measurement in the RRC_CONNECTED state.

According to this method, additional traffic loads may be distributed in the frequency domain while supporting the RedCap UE, thereby potentially supporting more RedCap UEs to perform access, compared to a method based on a CD-SSB for access of the RedCap UE. In addition, a BWP dedicated to the RedCap UE may be designated, and a non-CD-SSB may be placed in the corresponding BWP, thereby efficiently supporting the implementation of the dedicated BWP optimized for the RedCap UE. For example, considering that the number of antennas of the RedCap UE may be smaller than that of the NR UE to support repetition for coverage recovery/enhancement or in terms of beam management, the operation optimized for the RedCap UE may be a simplified operation where beam sweeping is not supported or a small number of times of beam sweeping is supported

[PBCH-R Transmission]

When a PBCH-R is transmitted in the above-described cell access examples, the PBCH-R may be transmitted after TDM with a CD-SSB or PBCH. The PBCH-R may consist of X (>=1) consecutive or non-consecutive OFDM symbols, and the position of the PBCH-R transmission OFDM symbol(s) may be determined by a relative time offset from the CD-SSB. In this case, the time offset may be predefined in units of OFDM symbols or slots. The position of the PBCH-R may be configured such that X=2 in consideration of the position of the SSB in the slot and the PBCH-R may be located between CD-SSBs. Alternatively, in consideration of the amount of PBCH-R information, coverage recovery/improvement, etc., X=4 may be configured, and two OFDM symbol pairs may be disposed before and after the CD-SSB. The above example is an example at SCS=15 kHz. When the SCS varies, the pattern of PBCH-R transmission OFDM symbols may also vary depending on a change in the location of the SSB in the slot.

Alternatively, a PBCH-R may be transmitted after FDM with a CD-SSB or PBCH. For example, the PBCH-R may be transmitted by performing FDM between OFDM symbols for transmitting a CD-SSB or PBCH. The PBCH is transmitted in the remaining three OFDM symbols except for the first OFDM symbols among the four OFDM symbols constituting the CD-SSB. In this case, the PBCH-R may be transmitted after FDM of the CD-SSB or PBCH over, for example, all four OFDM symbols or the last three OFDM symbols. In this case, if the symbol duration of the PBCH-R transmission is Y (>=0), X or Y may be predefined or broadcast by the PBCH. To receive the PBCH-R, the Red-Cap UE needs to know exactly the frequency location as well as the time location. Information on the frequency location of the PBCH-R may be provided over the PBCH as frequency offset Z relative to the CD-SSB or PBCH. The value of Z may be predefined in specifications when the PBCH signaling capacity is insufficient. For example, when Z=0, the PBCH-R may be transmitted adjacent to the PBCH. Assuming that the minimum value of PRB indices for transmitting the PBCH is n1 and the maximum value thereof is n2, the PBCH-R may be transmitted in a PRB region composed of M1 pieces corresponding to PRB indices of {n1+1, n1+2, . . . , n1+M2} and a PRB region composed of M2 pieces corresponding to PRB indices of {n1+1, n1+2, . . . , n1+M2}. In this case, each of M1 and M2 is the number of RBs of the PBCH-R transmitted around the PBCH. When both M1 and M2 are not 0, the PBCH-R may be transmitted such that the PBCH-R surround the PBCH in the frequency domain.

Alternatively, the time/frequency-domain resource for the PBCH-R transmission may be indicated by (joint encoding of) the start and length in the time/frequency domain. In the time domain, the resource may be configured in units of symbols or slots, and in the frequency domain, the resource may be configured in units of REs or RBs. According to above method, indexing may be performed except for a CD-SSB transmission region in the time/frequency domain in order to efficiently support the case where the PBCH-R is transmitted around the PBCH (such that the PBCH-R wraps around the PBCH). The excluded CD-SSB transmission region may be a 20-RB region used for PBCH transmission. Alternatively, when the PBCH-R transmission is scheduled around the PBCH (in the form of wrapping) to additionally secure PBCH-R transmission REs, the remaining 8-RB region except for a 12-RB region used for PSS transmission may be used for the PBCH-R transmission.

Alternatively, the PBCH-R may be transmitted in the remaining RBs that are not used for PBCH transmission in a CORESET #0 BW (=initial active DL BWP). The RedCap UE may identify the location of the starting point of the CORESET #0 BW based on PBCH reception and then recognize the location of RB(s) that are not used for the PBCH transmission in the corresponding CORESET #0 BW. Thus, the RedCap UE may attempt PBCH-R reception in the corresponding RBs. The above method may be limitedly applied when a RedCap maximum BW is the same as the CORESET #0 BW. Alternatively, when the RedCap maximum BW is greater than the CORESET #0 BW, the above method may be applied by transmitting the PBCH-R only in the CORESET #0 BW. Otherwise, a method of predefining the position of the PBCH-R or indicating the position thereof on the PBCH may be used. Alternatively, when the RedCap maximum BW is smaller than the CORESET #0 BW, the UE may not receive the CORESET #0 BW, so that the method of predefining the position of the PBCH-R or indicating the position thereof on the PBCH may be used. In this case, a method in which the relative position in the frequency domain from a CD-SSB in a CORESET #0-R BW (=initial active DL BW for RedCap devices) of the RedCap UE is preconfigured, and then the PBCH-R is transmitted in the remaining RBs that are not used for PBCH transmission within the CORESET #0 BW (=initial active DL BWP) with respect to the preconfigured CORESET #0-R BW may be applied. Alternatively, the UE may determine the PBCH-R transmission region according to the relationship between the RedCap maximum BW and CORESET #0 BW. For example, if RedCap maximum BW>=CORESET #0 BW, the UE may assume FDM transmission. Otherwise, the UE may assume TDM.

2. Cell Access Control of RedCap Device (Type)

As described above, it may be beneficial to control the access of the RedCap UE as early as possible in terms of UE power saving and cell access time reduction of the RedCap device. When RedCap devices are divided into multiple types to efficiently support various use cases, cell access may be controlled for each RedCap device type, whereby additional benefits may be expected. To this end, the present disclosure proposes methods of transmitting cell access control information, simply, barring information for each RedCap device or RedCap device type. The proposals in this clause ("2. Cell Access Control of RedCap Device (type)") may be implemented independently, but at least some of the proposals may be implemented/combined together as long as the implementation/combination does not conflict with the proposals described above in "1. Cell Access of RedCap UE".

[Access Control Related Proposal #1] Transmission of Cell Access Information during PBCH Transmission In "Access Control Related Proposal #1", a method of transmitting cell access information for a RedCap device (type) in a PBCH payload (e.g., SH202 of FIG. 9) is provided. According to this method, cell access control information may be transmitted at the earliest stage, and thus the method has the greatest benefit in terms of power saving and cell access time reduction.

[Explicit Indication Examples] the Following Methods May be Considered to Transmit Cell Access Information for a RedCap Device (Type) (e.g., Cell Barring Information for Each RedCap Device or Device Type) in a PBCH Payload.

Example C1) The cell access information for the RedCap device (type) is transmitted in part of the PBCH payload.

For FR1: If a total of three or four bits (two spare bits in an MIB and one or two unused/reserved bit(s) in a PBCH DMRS sequence) are available, the cell access information for the RedCap device (type) may be transmitted (e.g., in the form of a bitmap or by joint encoding) with the corresponding three or four bits.

Example C2) In a RedCap standalone (RSA) scenario, barring information (CellBarred, intraFreqReselection, etc.), which is transmitted in part of the PBCH payload for NR UE barring, may be reused as RedCap device (type) barring information.

To this end, details of Example 1-1: Indication of whether RedCap UE is supported in the clause "1. Cell Access of RedCap UE" may be referred.

[Implicit Indication Example] Cell access information for a RedCap device (type) may be transmitted in CORESET #0 scheduling information transmitted in a PBCH payload. In this case, if a CORESET #0(-R) BW is not within a supported range based on the BW supported by the device (type), the RedCap UE may be considered to be barred from a corresponding cell. To this end, details of Example 1-4:

Indication of whether RedCap UE is supported in the clause "1. Cell Access of RedCap UE" may be referred.

The above explicit and implicit indication methods may be used simultaneously or in combination. For example, when both the explicit and implicit indication methods are applied, if any one of the methods is barred, the RedCap device (type) may be considered to be barred. This may mean that the explicit indication method takes precedence when applied. Alternatively, this may be in consideration of a case in which the corresponding RedCap device (type) is not supported for other reasons although the RedCap device (type) supports CORESET #0(−R) in terms of the BW.

If the result by the above explicit/implicit indication method is Not Barred, the UE may attempt to receive SIB1(−R) in CORESET #0(−R) and continue to perform cell access.

[Access Control Related Proposal #2] Transmission of Cell Access Information during SIB1(−R) Transmission According to "Access Control Related Proposal #1", there is an advantage in that the UE may acquire cell access control information at the earliest stage, but it may not be easy to support the UE due to PBCH payload limitations. In this case, if CORESET #0(−R) information is set to a BW in which the RedCap device (type) is capable of receiving, the cell access control information for the RedCap device (type) may be transmitted in SIB1(−R) (e.g., SH204 in FIG. 9)

To this end, details of Example 1-2: Indication of whether RedCap UE is supported in the clause "1. Cell Access of RedCap UE" may be referred.

[Access Control Related Proposal #3] Transmission of Cell Access Information During Transmission of DCI Scheduling SIB1(−R)

To this end, details of Example 1-3: Indication of whether RedCap UE is supported in the clause "1. Cell Access of RedCap UE" may be referred.

The cell access control information for the RedCap device (type) may be transmitted as DCI content transmitted in CORESET #0(−R). In this case, the used DCI format may be DCI format 1_0 with a CRC scrambled by an SI-RNTI, and reserved bits of the corresponding DCI may be used. For example, barring information for three RedCap device types may be transmitted in a 3-bit bitmap among available 15 bits. According to this method, since the cell access control information may be obtained before SIB1(−R) transmission and PDSCH reception, it has advantages over "Access Control Related Proposal #2" in terms of power saving and cell access time reduction. This method has an advantage in terms of signaling capacity, compared to "Access Control Related Proposal #1". Thus, the method is more suitable for transmitting barring information for each RedCap device type or transmitting additional information other than barring information (e.g., frequency routing information, etc.)

For PDCCH-less SIB1(−R) transmission, it may be difficult to apply "Access Control Related Proposal #3". Thus, if PDCCH-less SIB1(−R) is applied while "Access Control Related Proposal #3" is configured, the UE may assume that the cell access control information is automatically transmitted according to "Access Control Related Proposal #2", that is, in SIB1(−R).

In the above proposals, when the RedCap device (type) is barred, the RedCap device (type) may stop attempting to access the corresponding cell and continue the cell search operation by changing the frequency. Alternatively, when the RedCap device is barred, the RedCap device may monitor additional information and determine subsequent operations. The additional information may be information such as intraFreqReselection described above. When the highest ranked cell is barred, the UE may attempt to access a new cell within the same frequency if intraFreqReselection is allowed. If the highest ranked cell is not allowed, the UE may attempt access the cell by changing the frequency.

The above-described "Access Control Related Proposal #1/2/3" may be sequentially applied for multi-level cell barring. For example, when there are $N_T$ RedCap device types, each device type may acquire cell access control information in the following time order: "Access Control Related Proposal #1→Access Control Related Proposal #3→Access Control Related Proposal #2". In this case, among the $N_T$ RedCap device types, $M_1$ RedCap device types (where $M_1>=0$) may be barred by Access Control Related Proposal #1 for reasons such as a difference in BWs supported by each RedCap device type. Among the passed ($N_T-M_1$) RedCap device types, $M_3$ RedCap device types (where $M_3>=0$) may be barred by Access Control Related Proposal #3. Then, among the passed remaining ($N_T-M_1-M_3$) RedCap device types, M2 RedCap device types (where $M2>=0$) may be barred by Access Control Related Proposal #2. A total of ($M_1+M_3+M_2$) RedCap device types may be barred, and ($N_T-M_1-M_3-M_2$) RedCap device types may be allowed to perform access (where $N_T>=M_1+M_3+M_2$).

3. RedCap Standalone (RSA)

If the access of the NR UE is restricted in an RSA scenario, it may be useful in terms of power saving or access time reduction from the perspective of the NR UE. In this clause, NR UE barring in the RSA situation and operations of the RedCap UE will be described. The methods proposed in this clause may be applied for the following purposes: traffic control of the NR UE or RedCap UE or BS maintenance even if it is not the RSA situation. In the RSA situation, a conventional NR UE barring method may be applied for NR UE barring That is, barring information (CellBarred, intraFreqReselection, etc.) in an MIB transmitted in a partial PBCH payload may be used for the same purpose as in the prior art.

[RSA Related Proposal #1]

When the NR UE is barred, that is, when Cell Barred of the MIB is Barred, the RedCap UE may confirm that a corresponding cell is an RSA cell and perform RSA operations, where the RSA operations are predefined for RSA situations. For example, RSA operations may include: defining/interpreting (or reinterpreting) reserved/spare bits of a PBCH payload/MIB for the RedCap UE only; or interpreting (part of) the PBCH payload bits differently from those interpreted by the NR UE (e.g., SIB1/SIB1-R scheduling information, information on whether the RedCap UE is supported, RedCap UE (type) barring information, etc.)

[RSA Related Proposal #2]

When the NR UE is barred, that is, when Cell Barred of the MIB is Barred, the RedCap UE may obtain cell access control information (e.g., barring information) according to "Access Control Related Proposal #2" and determine whether access is allowed.

When the NR UE is barred, the RedCap UE may operate in the same way as described in the clause "2. Cell Access Control of RedCap Device (Type)".

[RSA Related Proposal #3]

When the NR UE is barred, that is, when Cell Barred of the MIB is Barred, the RedCap UE may obtain cell access control information (e.g., barring information) according to "Access Control Related Proposal #3" and determine whether access is allowed.

Figure 11:
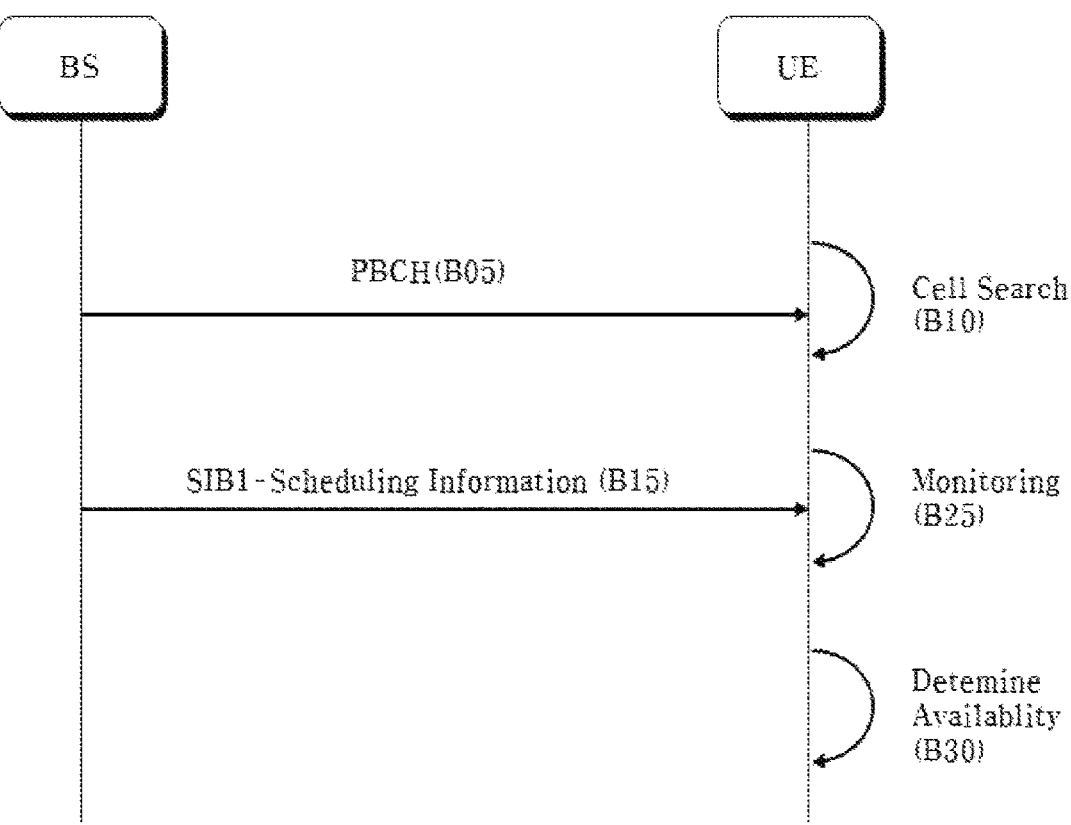
FIG. 11 illustrates an exemplary signal transmission/reception method according to an embodiment of the present disclosure.

FIG. 11 illustrates an exemplary signal transmission/reception method based on at least one of the above-described proposals. FIG. 11 is merely one example to which present disclosure is applicable, and thus the present disclosure is not limited to the example of FIG. 11. The above-described details may be referred to for illustration of FIG. 17 even if not explicitly stated.

The BS may transmit a PBCH signal through a first cell (B05). The UE may receive the PBCH signal of the first cell through cell search (B10). The BS may allow access of a second type of UE with reduced capability to support a narrower BW than a first type of UE on at least one cell. The UE may be the second type of UE with the reduced capability to support the narrower BW than the first type of UE.

The BS may transmit SIB1-scheduling information in a CS S set related to the PBCH signal (B15). The UE may receive the SIB1-scheduling information in the CSS set related to the PBCH signal. For example, the UE may receive the SIB1-scheduling information by monitoring PDCCH candidates (B25) in a CORESET/CSS configured based on the PBCH.

Based on a reserved bit state that is not to be used by the first type of UE in the SIB1-scheduling information, the BS may indicate whether the first cell allows the access of the second type of UE.

In determining whether to perform a residual access procedure to the first cell, the UE may determine whether the UE is allowed to access the first cell as the second type of UE based on the reserved bit state that is not to be used by the first type of UE in the SIB1-scheduling information (B30).

Based on whether the reserved bit state corresponds to the first state, the UE may perform the residual access procedure to the first cell or search for a second cell without performing the residual access procedure.

Based on that the reserved bit state does not correspond to the first state, the UE may determine that as the second type of UE, the UE is allowed to access the first cell and obtain scheduling information in SIB1 for the second type of UE from the reserved bit state.

Based on that the reserved bit state does not correspond to the first state, the UE may determine that the SIB1-scheduling information schedules both first SIB1 related to the first type of UE and second SIB1 related only to the second type of UE.

Based on the determination that the UE is allowed to access the first cell as the second type of UE, the UE may receive second SIB1 related only to the second type of UE based on the SIB1-scheduling information. The UE may determine a resource location of second SIB1 based on a resource location of first SIB1 related to the first type of UE.

The UE may obtain an offset between the resource location of first SIB1 and the resource location of second SIB1 based on the reserved bit state.

The SIB1-scheduling information may be DCI received in a PDCCH-CSS set shared between the first type of UE and the second type of UE.

Based on that scheduling information in SIB1 for the second type of UE is obtained from the reserved bit state, the UE may determine that the first cell allows the access of the second type of UE.

Figure 12:
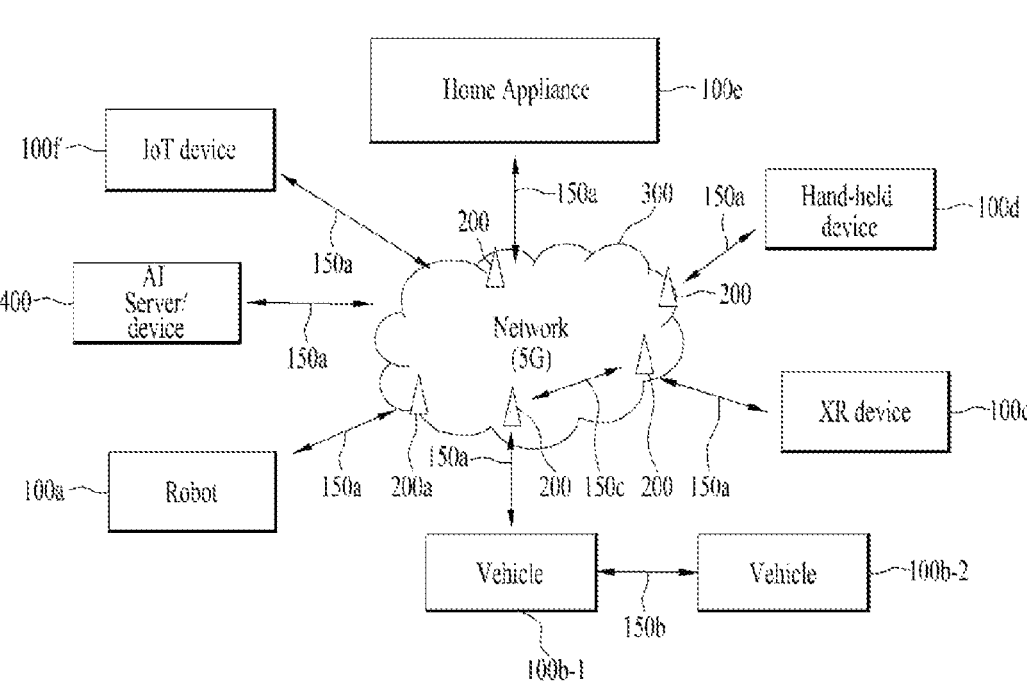
FIGS. 12 and 13 illustrate a communication system 1 and wireless devices applied to the present disclosure.

FIG. 12 illustrates a communication system 1 applied to the present disclosure.

Referring to FIG. 12, a communication system 1 includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices.

The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smart-pad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 13:
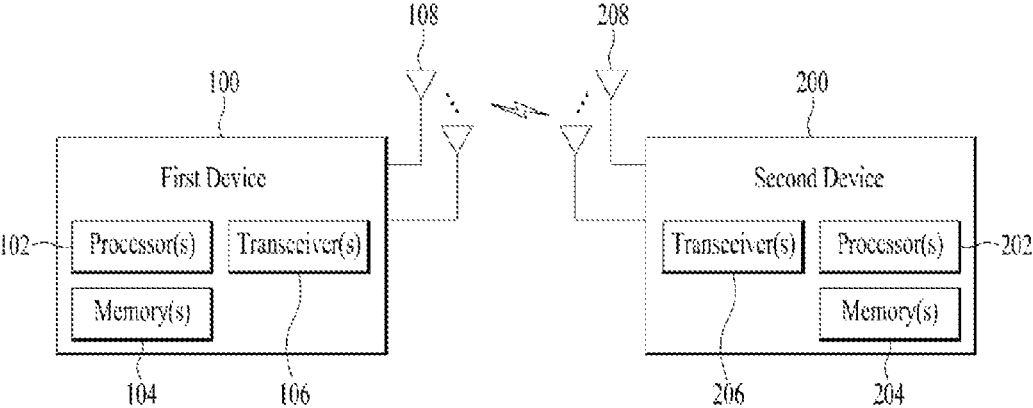

FIG. 13 illustrates wireless devices applicable to the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 14:
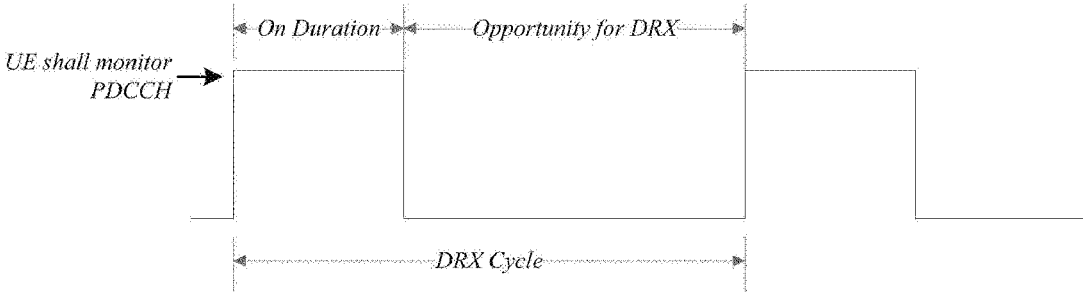
FIG. 14 illustrates a discontinuous reception (DRX) operation applicable to the present disclosure.

FIG. 14 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CO-NNECTED state (RRC_CONNECTED DRX) will be described below.

A DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

The above-described embodiments are combinations of elements and features of the present disclosure in specific forms. The elements or features may be considered selective unless mentioned otherwise. Each element or feature may be implemented without being combined with other elements or features. Further, the embodiments of the present disclosure may be configured by combining some elements and/or some features. Operation orders described in the embodiments of the present disclosure may be rearranged. Some constructions or features of any one embodiment may be included in another embodiment or may be replaced with corresponding constructions or features of another embodiment. It is obvious that claims that are not explicitly cited in the appended claims may be presented in combination as an embodiment of the present disclosure or included as a new claim by subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method performed by a user equipment (UE), the method comprising:

receiving a physical broadcast channel (PBCH) signal of a first cell through cell search;

receiving, based on the PBCH signal, downlink control information (DCI) for scheduling a system information block 1 (SIB1) of the first cell; and determining whether to receive the SIB1 of the first cell based on the DCI, wherein the UE is a second type UE with reduced capability to support a narrower bandwidth than a first type UE, wherein the DCI includes reserved bits, and the reserved bits are used for the second type UE, wherein the UE determines whether to receive the SIB1 of the first cell based on the reserved bits in the DCI, and wherein based on that the reserved bits do not have a first value, the SIB1 of the first cell includes both (i) first SIB1 information related to the first type UE and (ii) second SIB1 information dedicated to the second type UE.

2. The method of claim 1, wherein based on whether the reserved bits have the first value, the UE determines whether to receive the SIB1 of the first cell or to search for a second cell without receiving the SIB1 of the first cell.

3. The method of claim 2, wherein based on that the reserved bits do not have the first value, the UE determines to receive the SIB1 of the first cell.

4. The method of claim 1, further comprising:
receiving the second SIB1 information,
wherein the UE determines a resource location of the second SIB1 information based on a resource location of the first SIB1 information.

5. The method of claim 4, wherein the UE obtains an offset between the resource location of the first SIB1 information and the resource location of the second SIB1 information based on the reserved bits.

6. The method of claim 1, wherein the DCI is received in a physical downlink control channel (PDCCH)-common search space (CSS) set shared between the first type UE and the second type UE.

7. A non-transitory processor-readable storage medium configured to store a program for executing the method of claim 1.

8. A device comprising:
a memory configured to store instructions; and
a processor configured to execute the instructions to:
receive a physical broadcast channel (PBCH) signal of a first cell through cell search;
receive, based on the PBCH signal, downlink control information (DCI) for scheduling a system information block 1 (SIB1) of the first cell; and
determine whether to receive the SIB1 of the first cell based on the DCI,
wherein the device is a second type device with reduced capability to support a narrower bandwidth than a first type device,
wherein the DCI includes reserved bits which are not used for the first type device,
wherein the device determines whether to receive the SIB1 of the first cell based on the reserved bits in the DCI, and
wherein based on that the reserved bits do not have a first value, the SIB1 of the first cell includes both (i) first SIB1 information related to the first type device and (ii) second SIB1 information dedicated to the second type device.

9. The device of claim 8, further comprising:
a transceiver configured to transmit and receive a radio signal under control of the processor,
wherein the device is a user equipment (UE).

10. The device of claim 8, wherein the device is an application-specific integrated circuit (ASIC) or a digital signal processing device.

11. A method performed by a base station, the method comprising:
transmitting a physical broadcast channel (PBCH) signal through a first cell; and
transmitting, based on the PBCH signal, downlink control information (DCI) for scheduling a system information block 1 (SIB1) of the first cell,
wherein the base station is configured to support a second type user equipment (UE) on at least one cell, wherein the second type UE has reduced capability to support a narrower bandwidth than a first type UE,
wherein the DCI includes reserved bits, and the reserved bits are used for the second type UE,
wherein the base station indicates, based on the reserved bits in the DCI, whether the second type UE should receive the SIB1 of the first cell, and
wherein based on that the reserved bits do not have a first value, the SIB1 of the first cell includes both (i) first SIB1 information related to the first type UE and (ii) second SIB1 information dedicated to the second type UE.

12. A base station comprising:
a memory configured to store instructions; and
a processor configured to execute the instructions to:
transmit a physical broadcast channel (PBCH) signal through a first cell; and
transmit, based on the PBCH signal, downlink control information (DCI) for scheduling a system information block 1 (SIB1) of the first cell,
wherein the processor is configured to support a second type user equipment (UE) on at least one cell, wherein the second type UE has reduced capability to support a narrower bandwidth than a first type UE,
wherein the DCI includes reserved bits, and the reserved bits are used for the second type UE, and
wherein the processor is configured to indicate, based on the reserved bits in the DCI, whether the second type UE should receive the SIB1 of the first cell, and
wherein based on that the reserved bits do not have a first value, the SIB1 of the first cell includes both (i) first SIB1 information related to the first type UE and (ii) second SIB1 information dedicated to the second type UE.

* * * * *